United States Patent [19]

Sigiki et al.

[11] Patent Number: 4,714,971
[45] Date of Patent: Dec. 22, 1987

[54] METHOD AND APPARATUS FOR REPRODUCING SIGNALS HAVING IMPROVED ROTARY HEAD TRACKING CONTROL

[75] Inventors: Hiraku Sigiki, Saitama; Makoto Yamada; Shinji Miyamori, both of Tokyo, all of Japan

[73] Assignee: Sony Corporation, Tokyo, Japan

[21] Appl. No.: 769,422

[22] Filed: Aug. 26, 1985

[30] Foreign Application Priority Data

Sep. 7, 1984 [JP] Japan .................................. 59-187368

[51] Int. Cl.$^4$ .................... G11B 5/584; G11B 5/09; G11B 15/467
[52] U.S. Cl. .................................. 360/77; 360/18; 360/27; 360/32
[58] Field of Search .................. 360/77, 70, 32, 27, 360/34, 75, 18, 39, 57, 73, 8, 10.1–10.3, 19.1, 33.1, 40, 48, 49; 358/341, 343

[56] References Cited

U.S. PATENT DOCUMENTS

| | | | |
|---|---|---|---|
| 4,451,860 | 5/1984 | Honjo et al. | 360/77 |
| 4,528,605 | 7/1985 | Hiraguri | 360/77 |
| 4,530,012 | 7/1985 | Kinjo | 360/77 |
| 4,544,966 | 10/1985 | Taniguchi | 360/75 |

FOREIGN PATENT DOCUMENTS

| | | | |
|---|---|---|---|
| 0113986 | 7/1984 | European Pat. Off. | 360/27 |
| 56-68923 | 6/1981 | Japan | 360/27 |
| 56-119917 | 9/1981 | Japan | 360/27 |

Primary Examiner—Aristotelis M. Psitos
Assistant Examiner—Steven R. Garland
Attorney, Agent, or Firm—Lewis H. Eslinger; Alvin Sinderbrand

[57] ABSTRACT

In an apparatus for reproducing signals recorded in a plurality of slant tracks on a recording medium by a rotary head, the signals in the tracks contain a digital information signal in a first predetermined area on the slant tracks and a tracking control signal including a tracking pilot signal and an erase signal in a second predetermined area. When the recorded tracks are reproduced by a rotary playback head having a tracing width greater than the track width, the pilot signals from the adjacent tracks will be detected and compared in level. A tracking signal for controlling the tracking alignment of the rotary playback head is generated in response to the level comparison. The level of the tracking signal is adjusted in response to the level of the tracking control signal.

6 Claims, 127 Drawing Figures

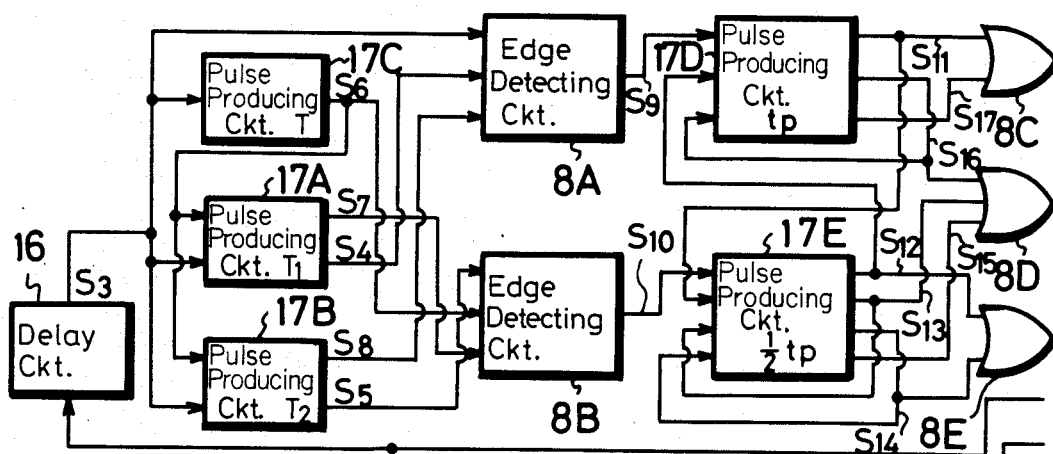
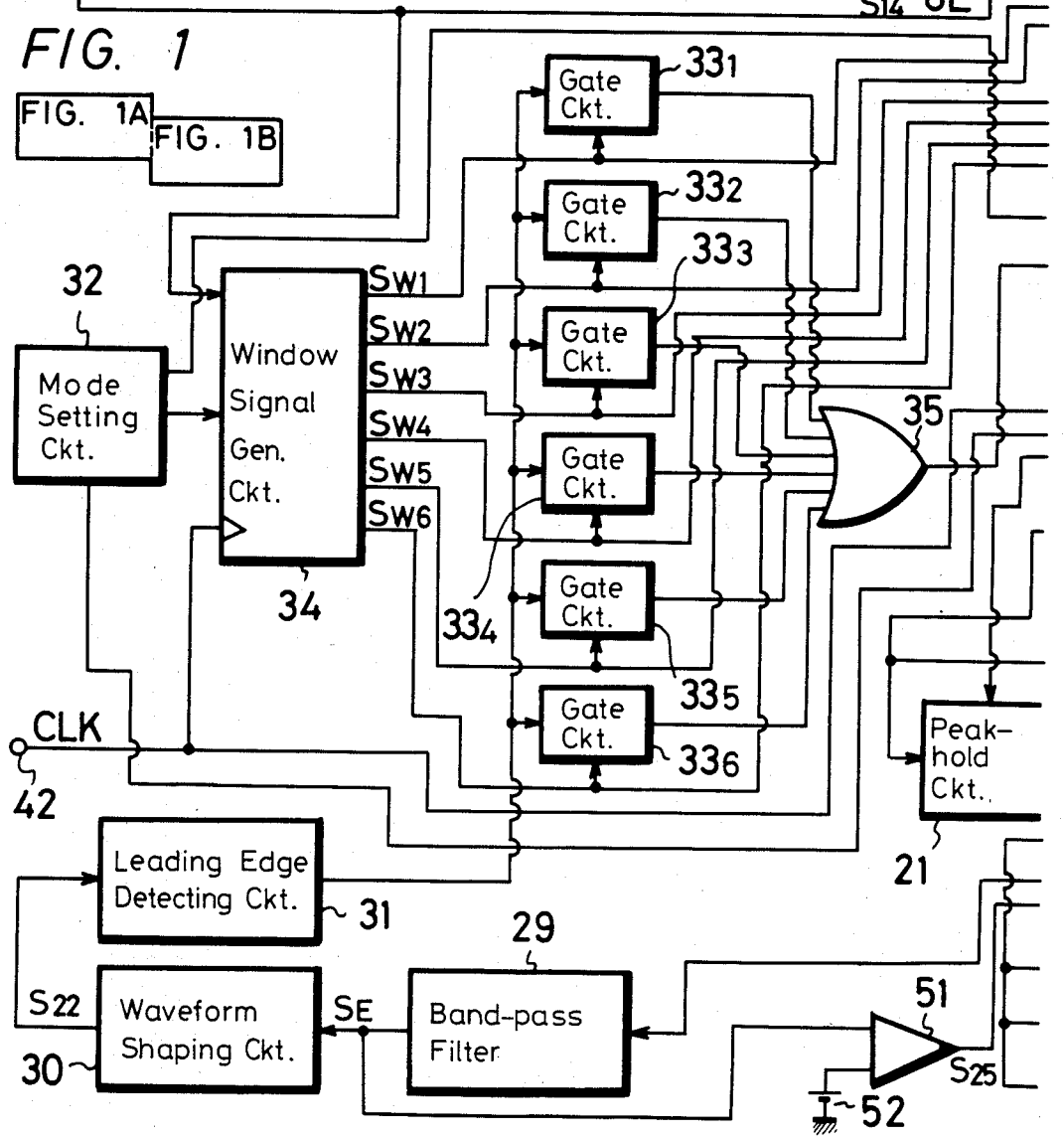
FIG. 1A
FIG. 1

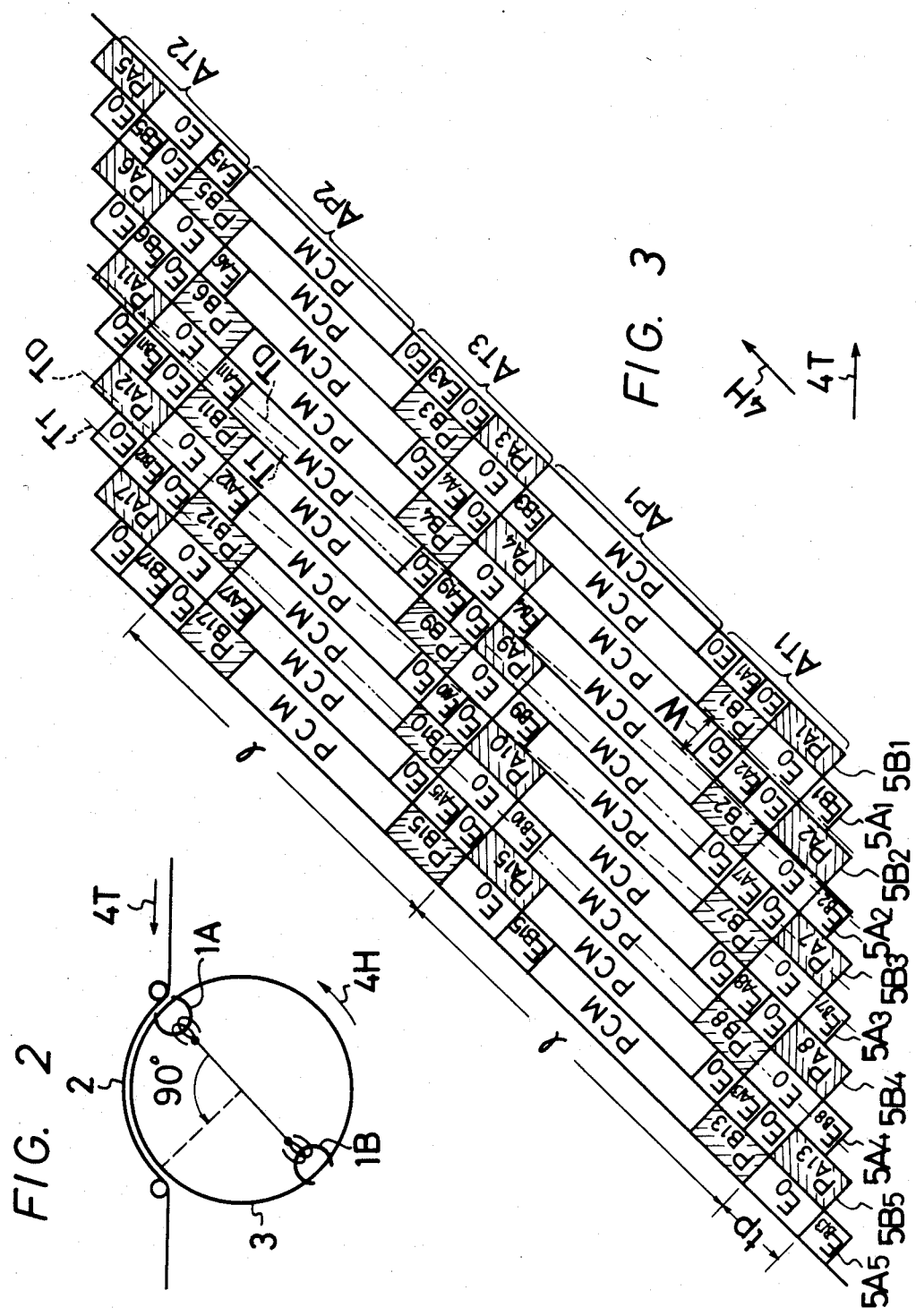

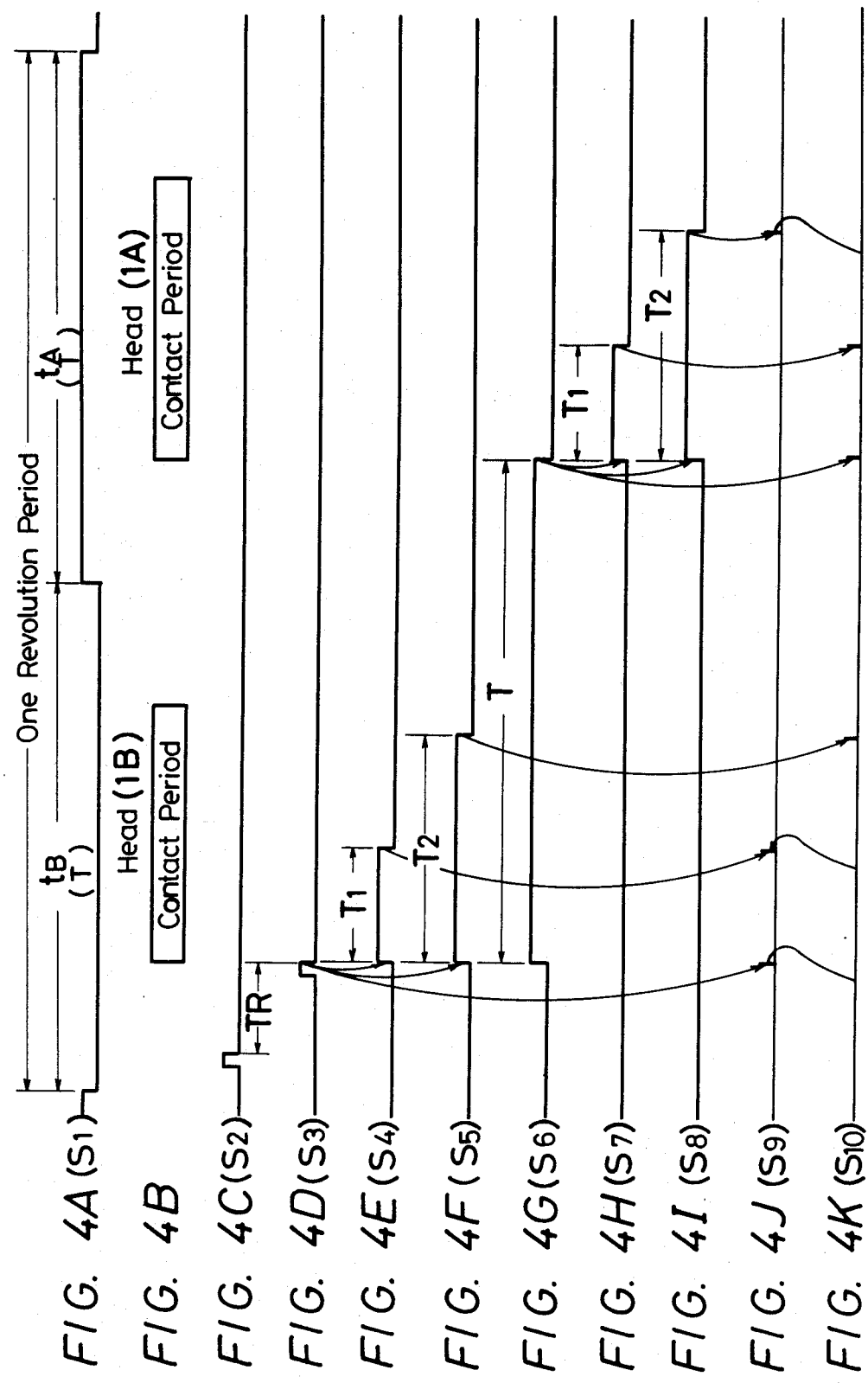

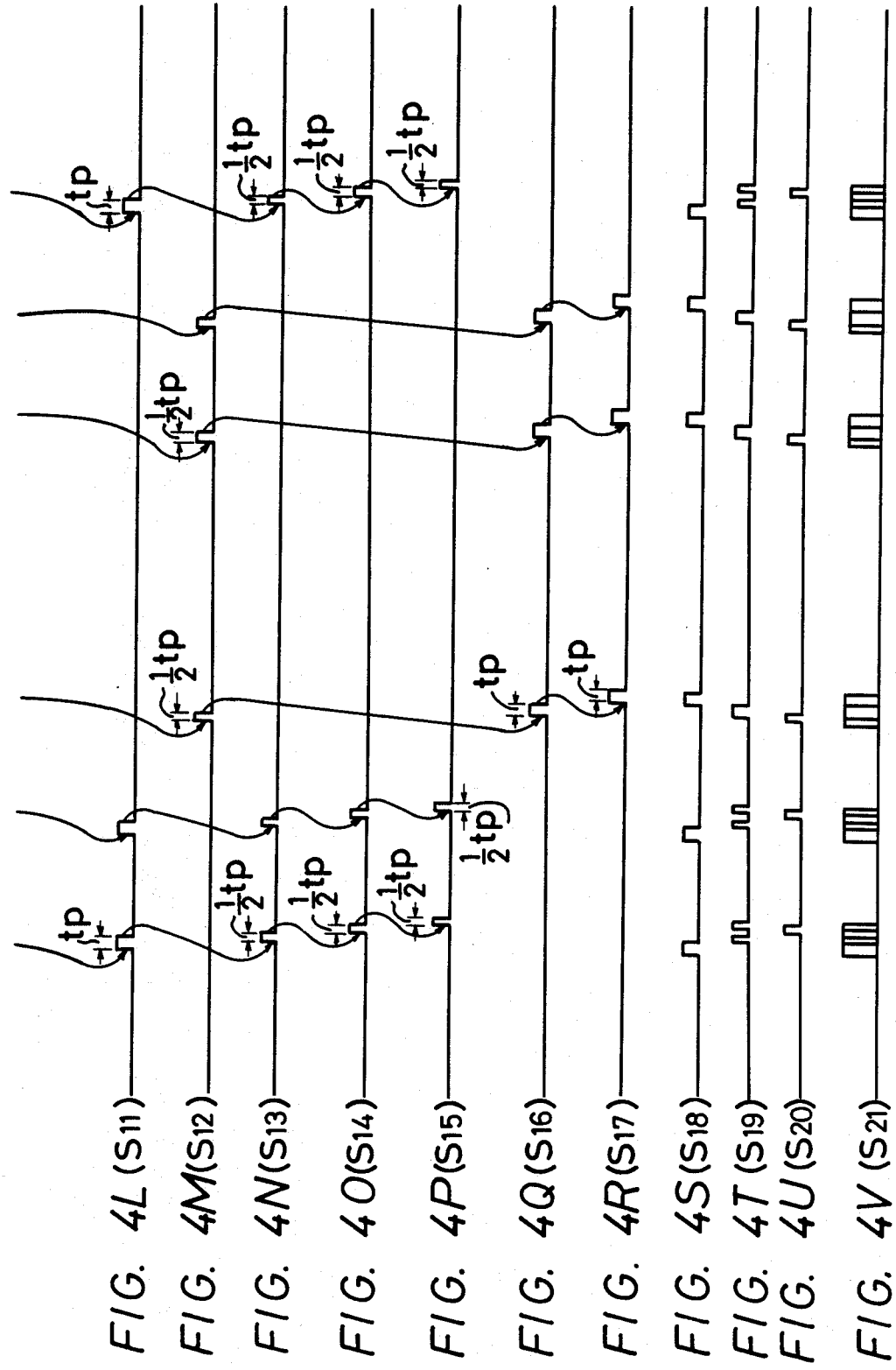

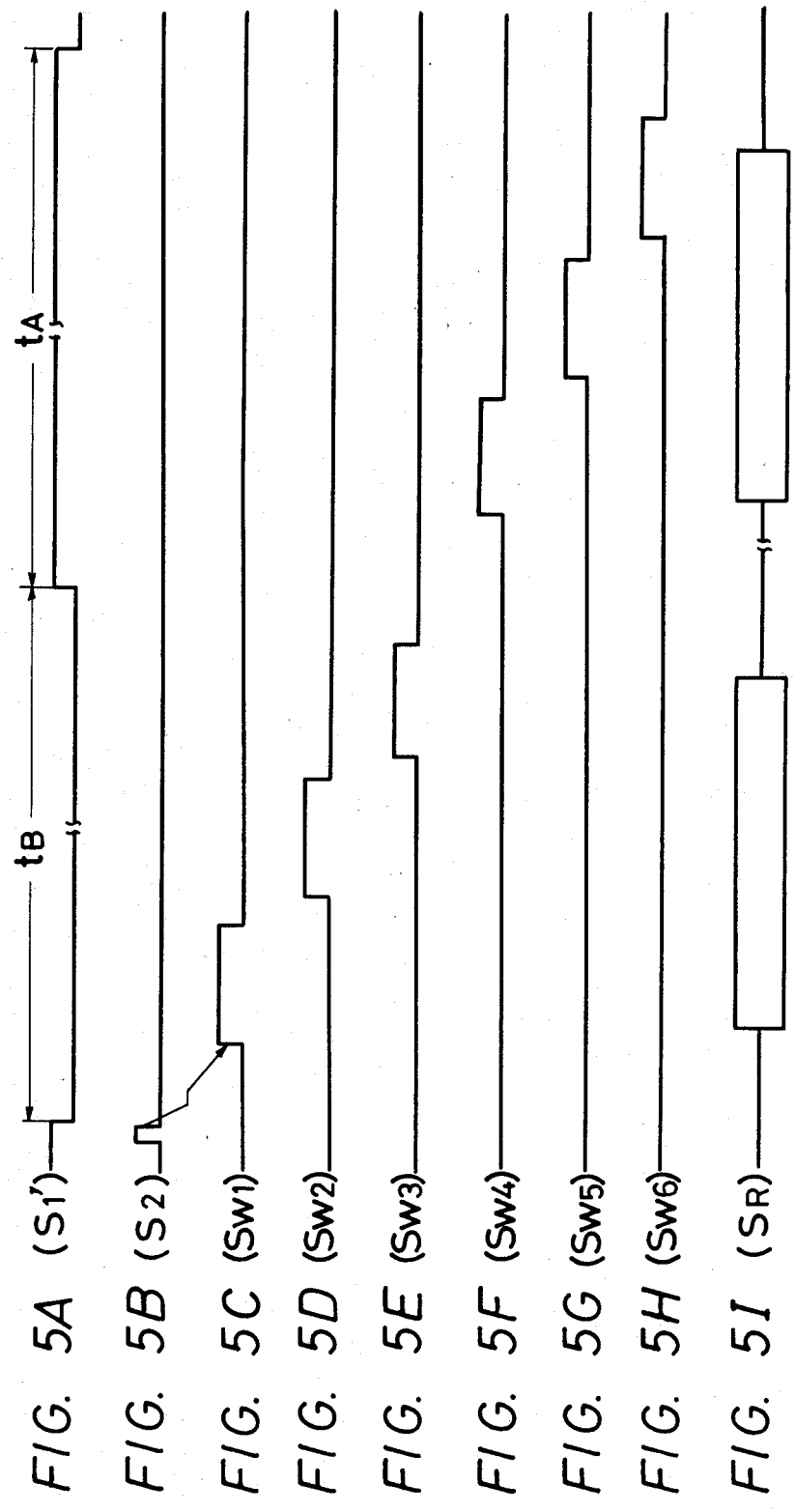

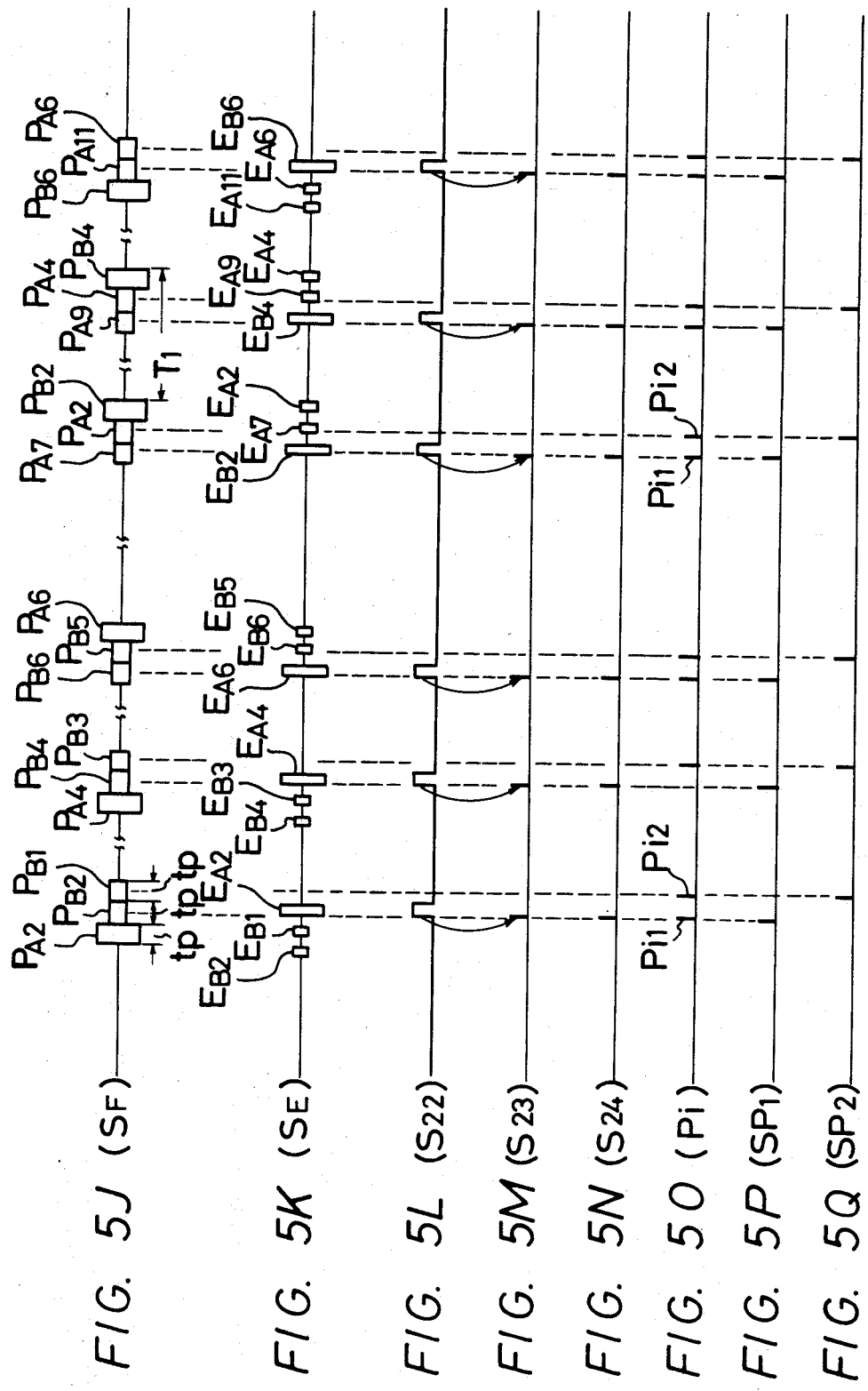

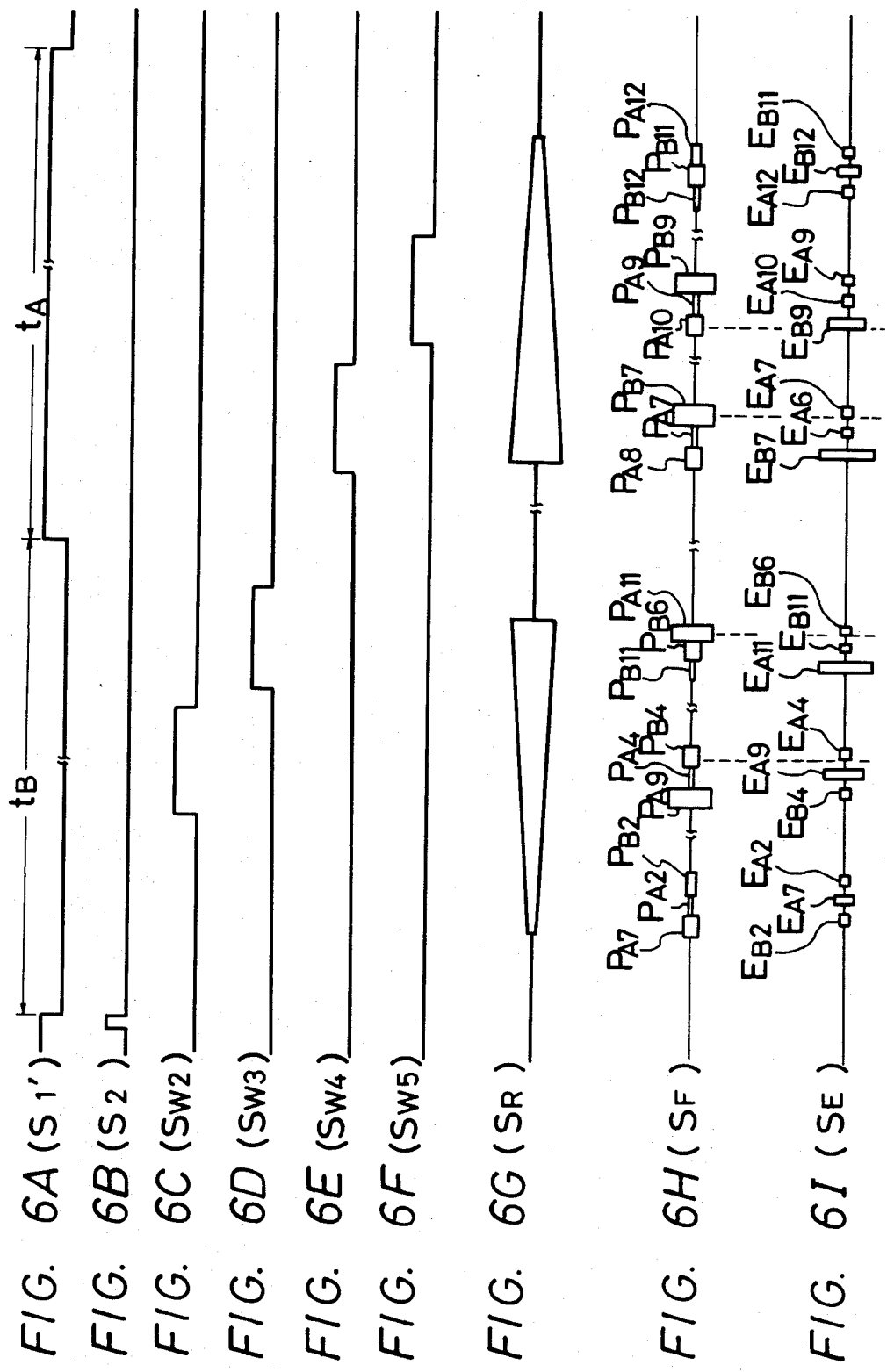

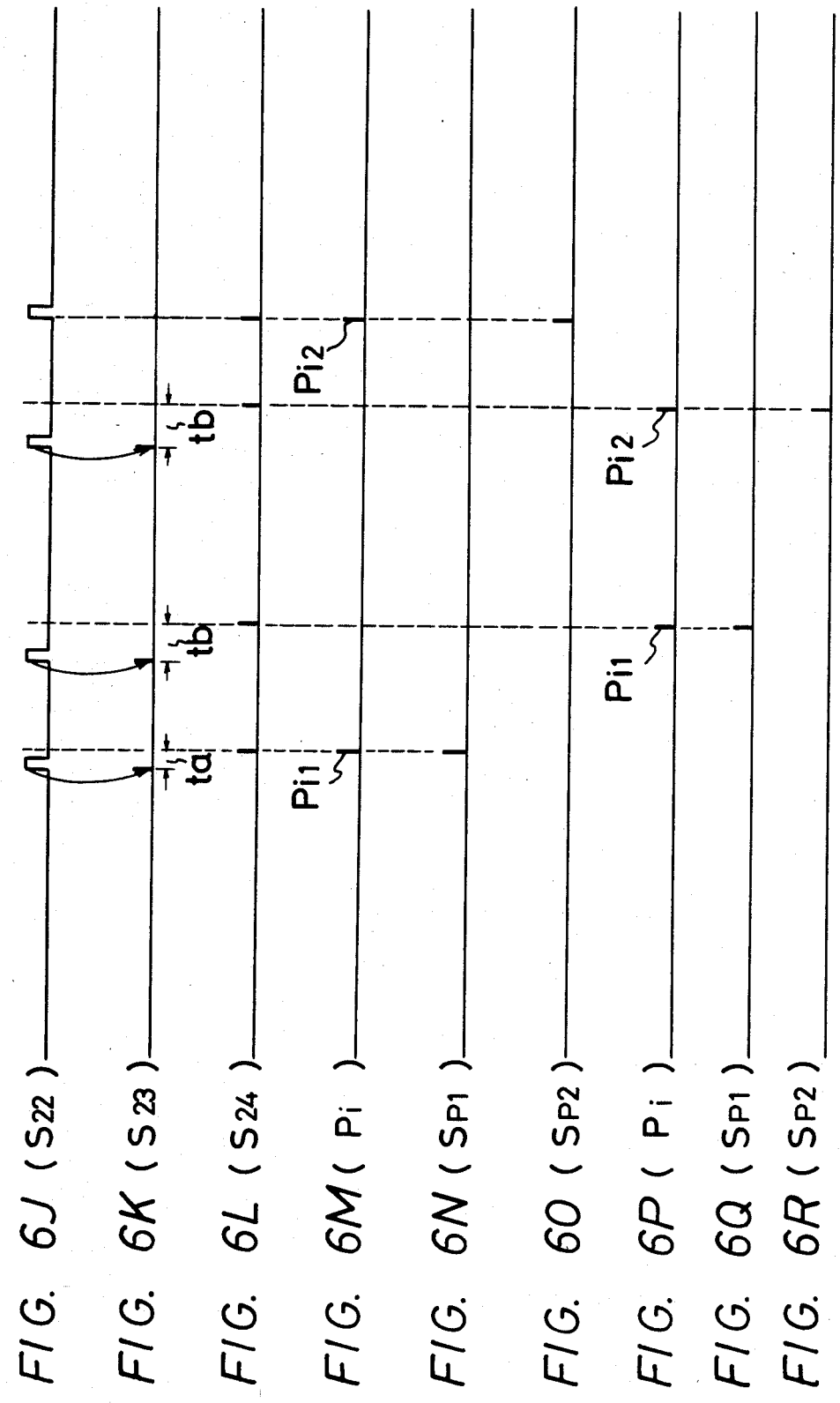

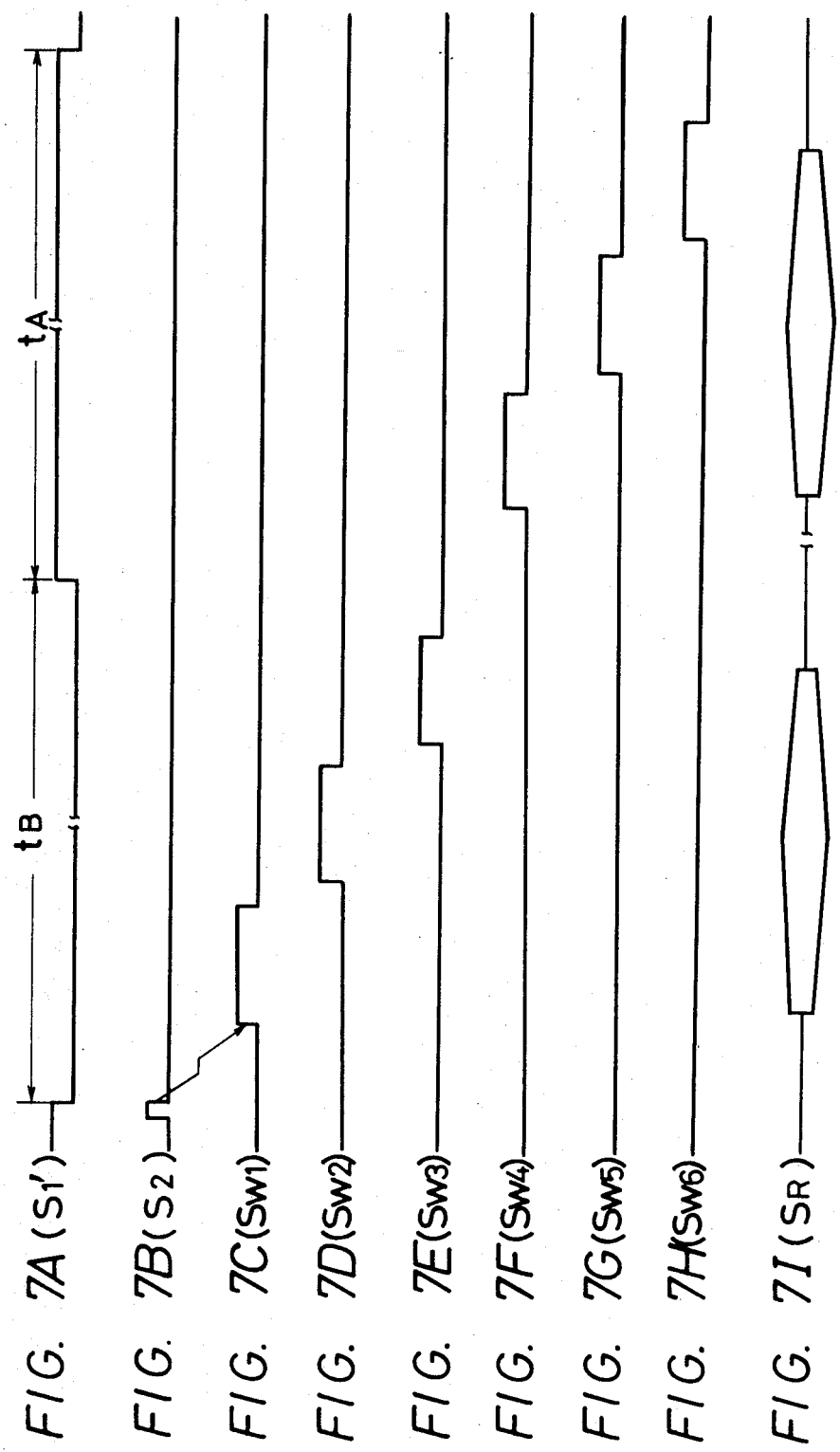

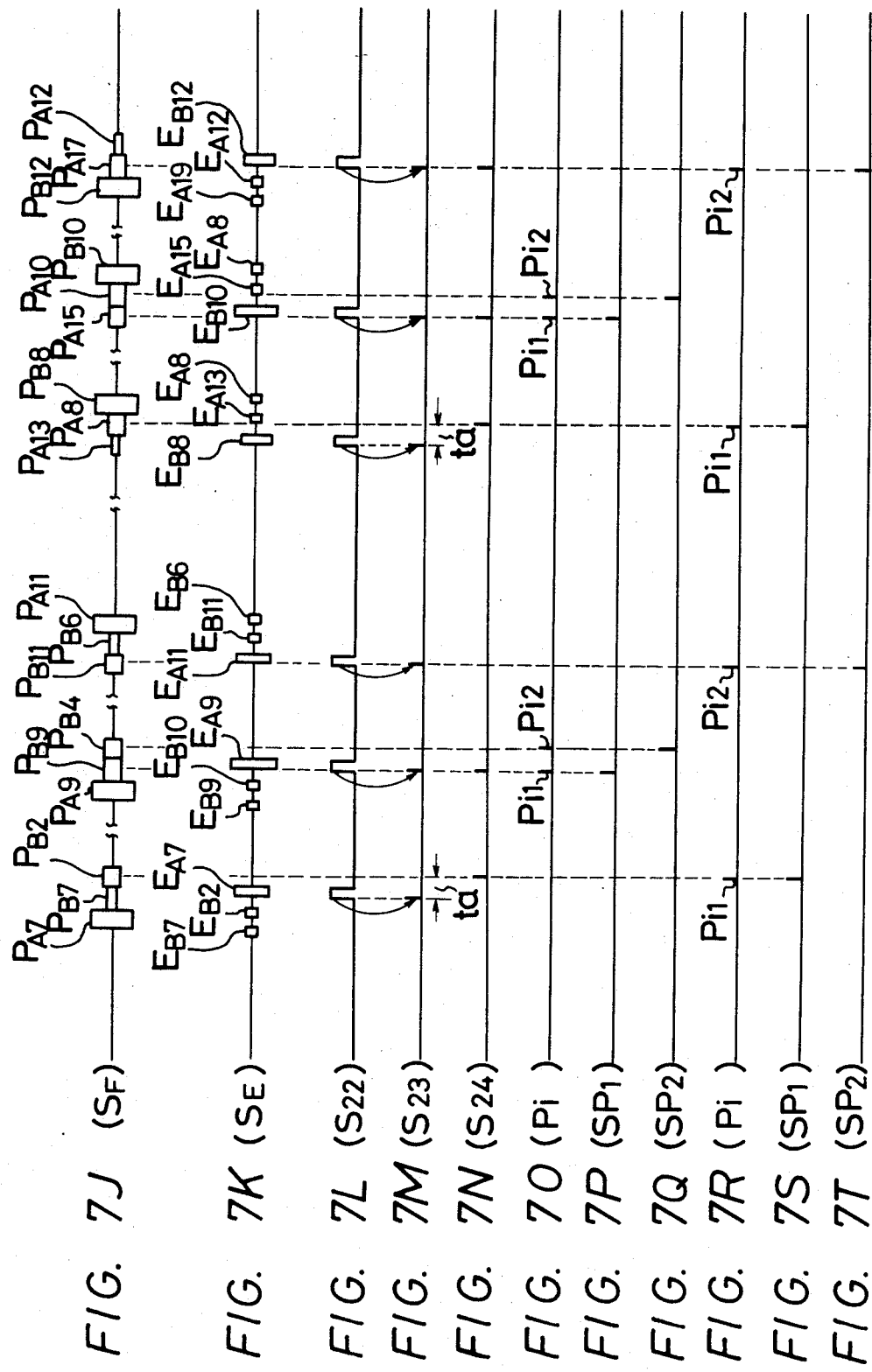

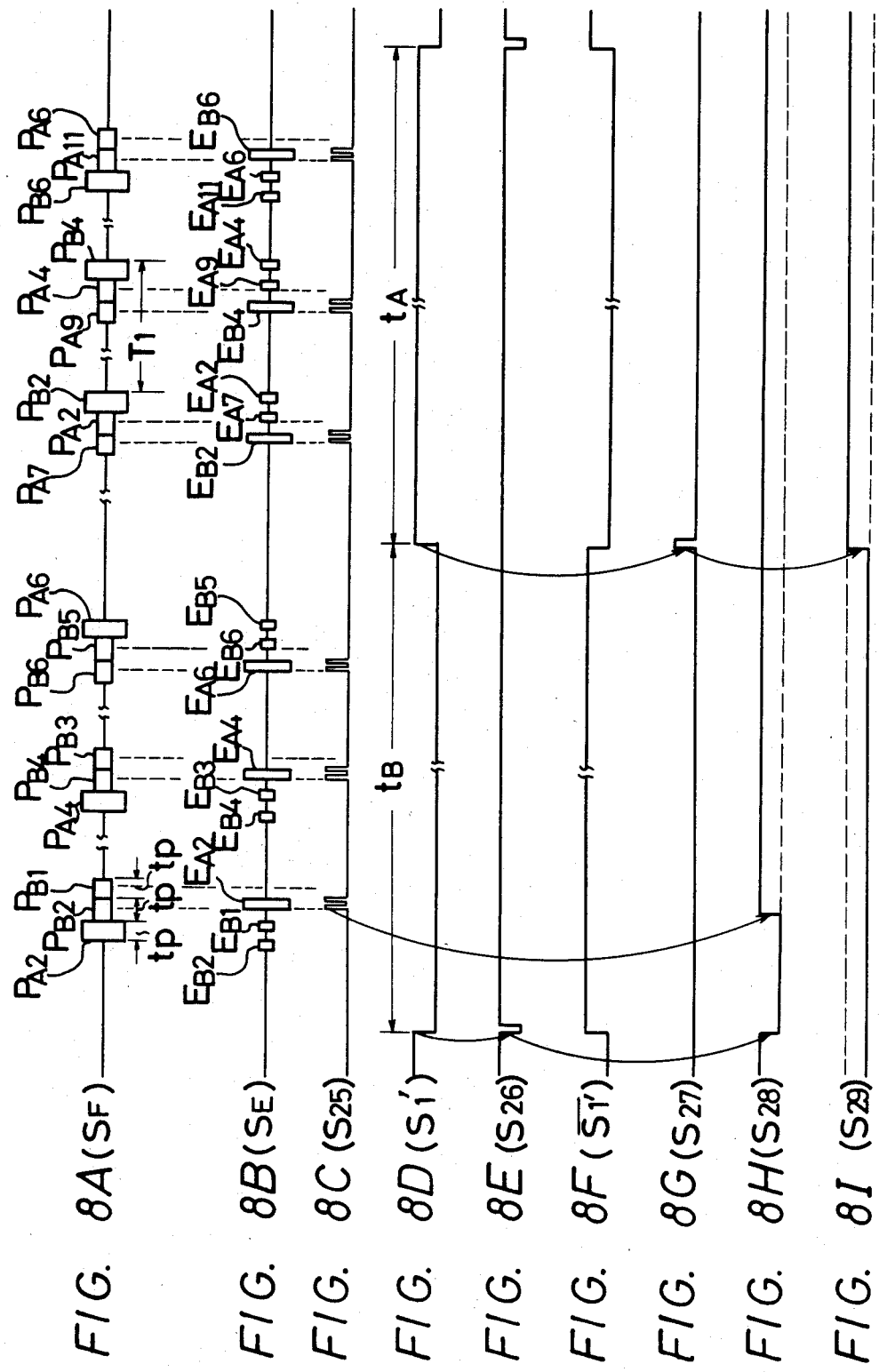

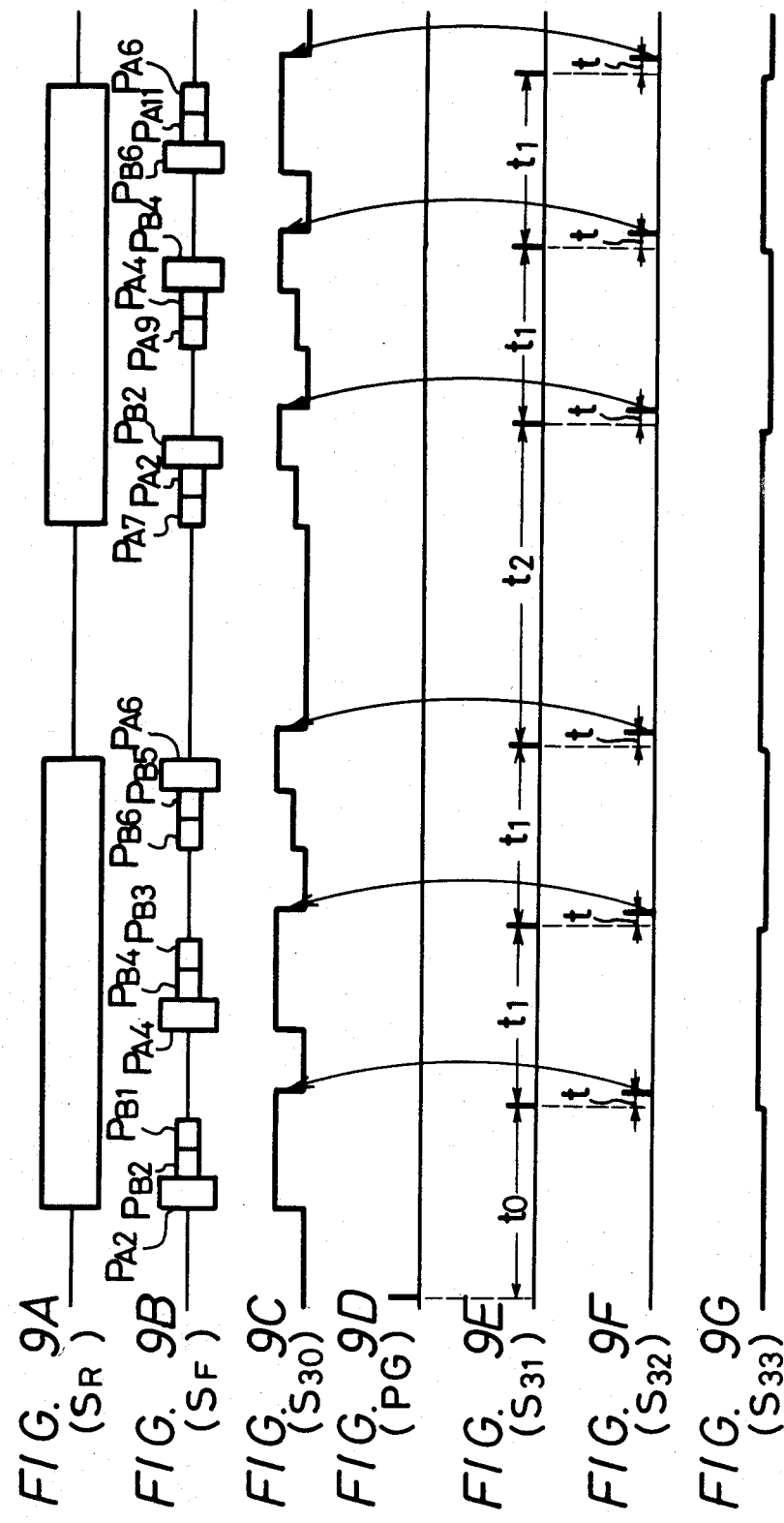

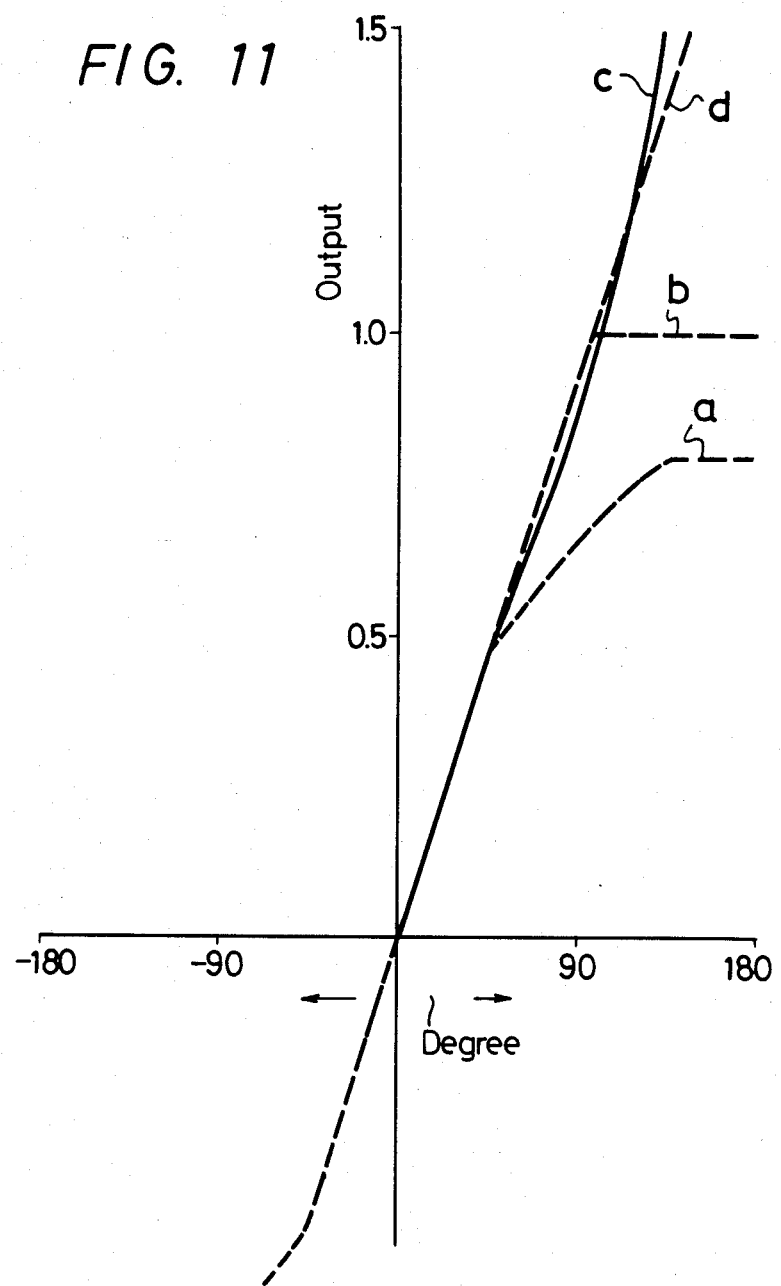

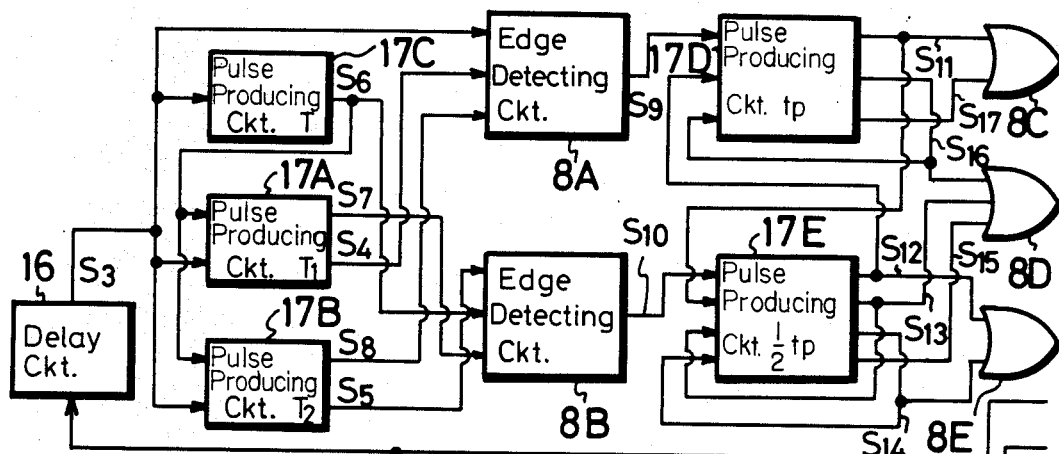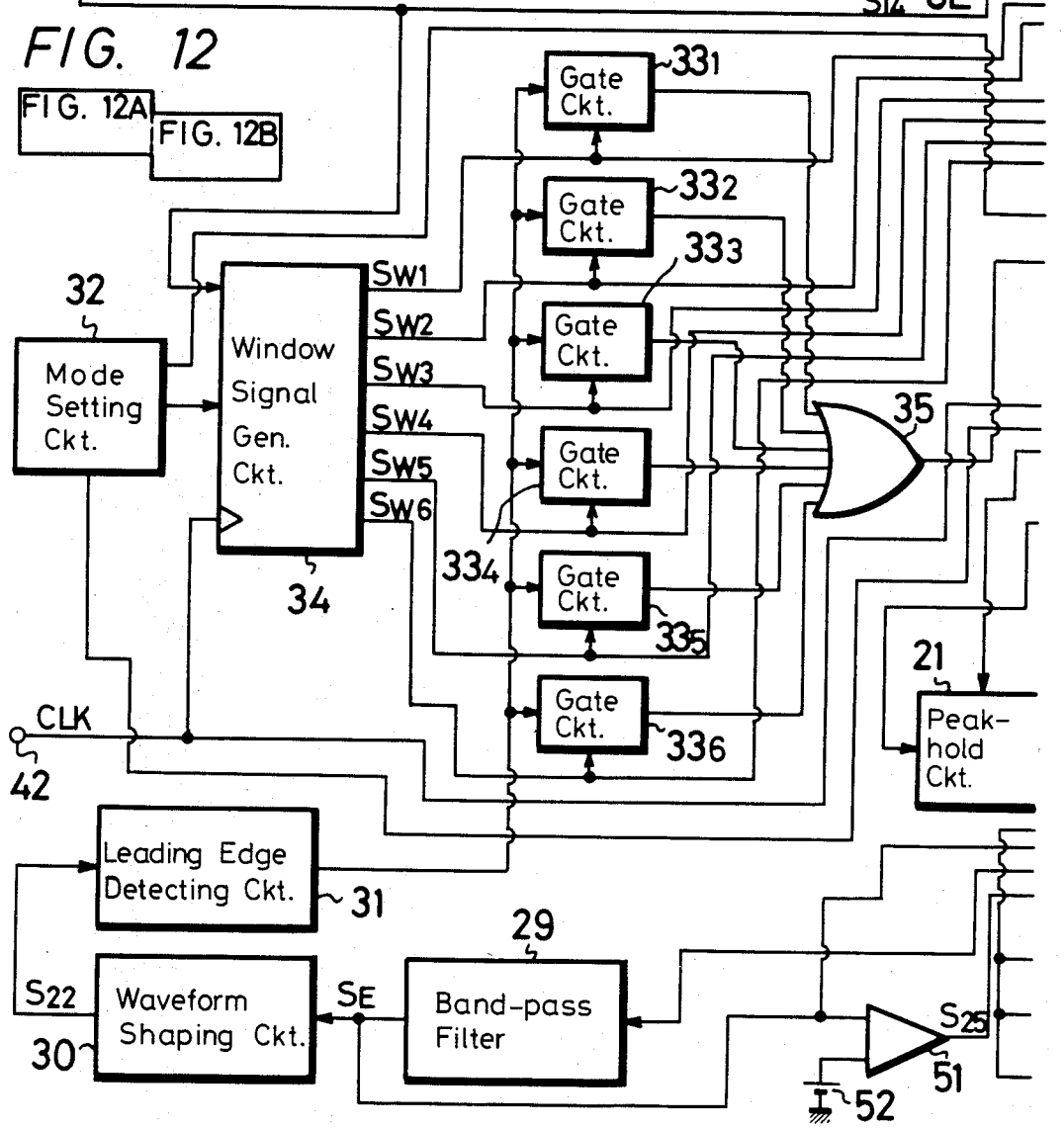

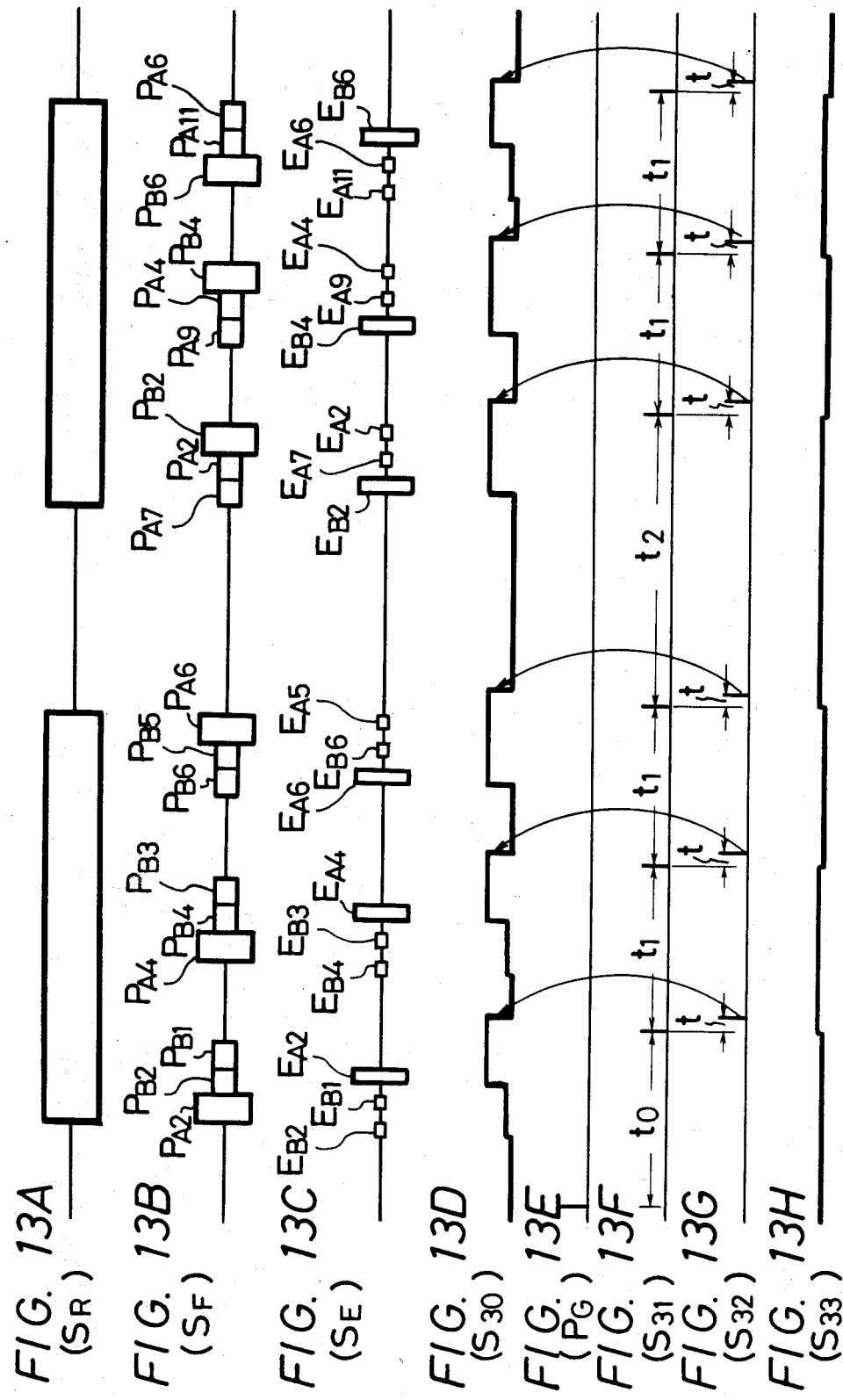

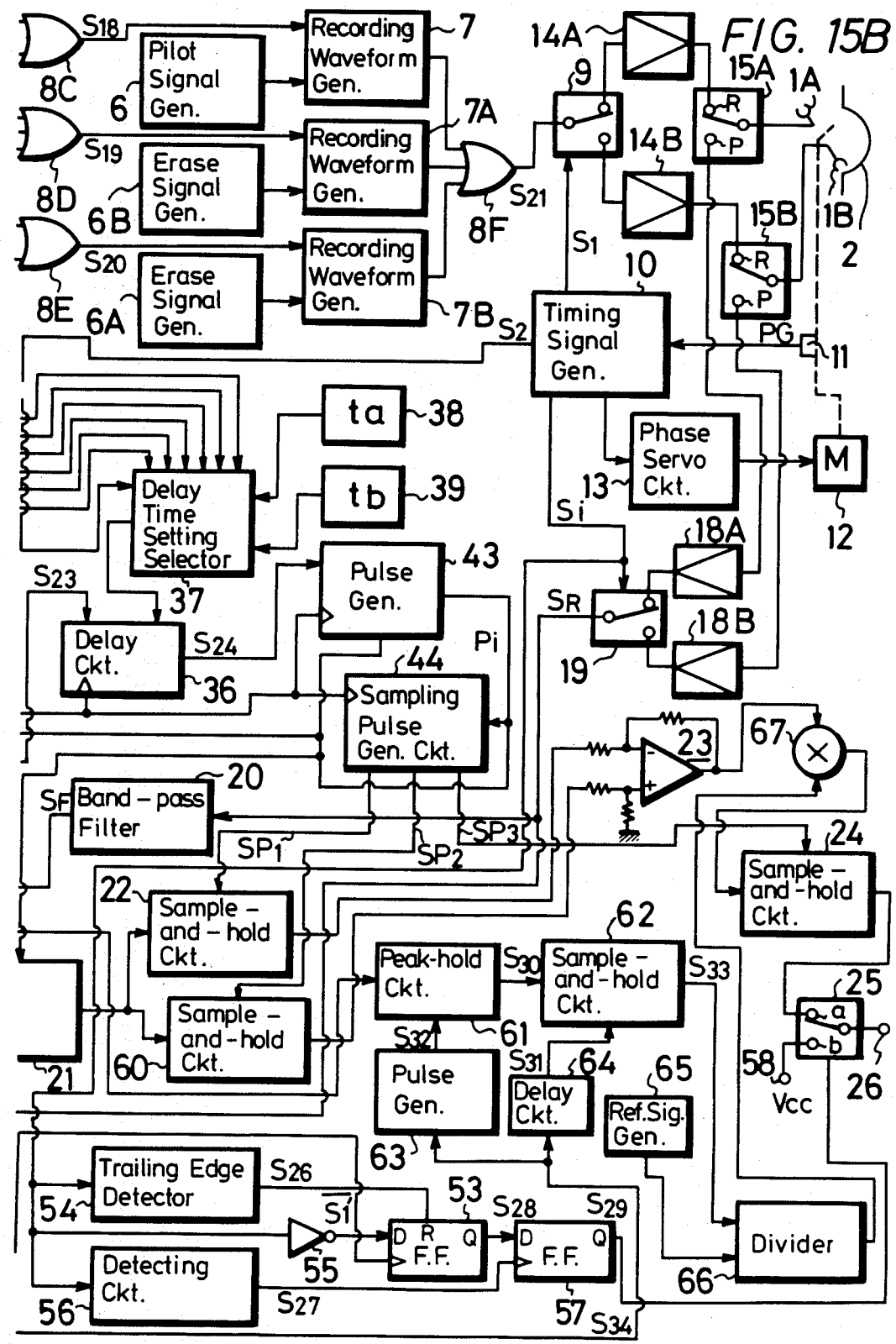

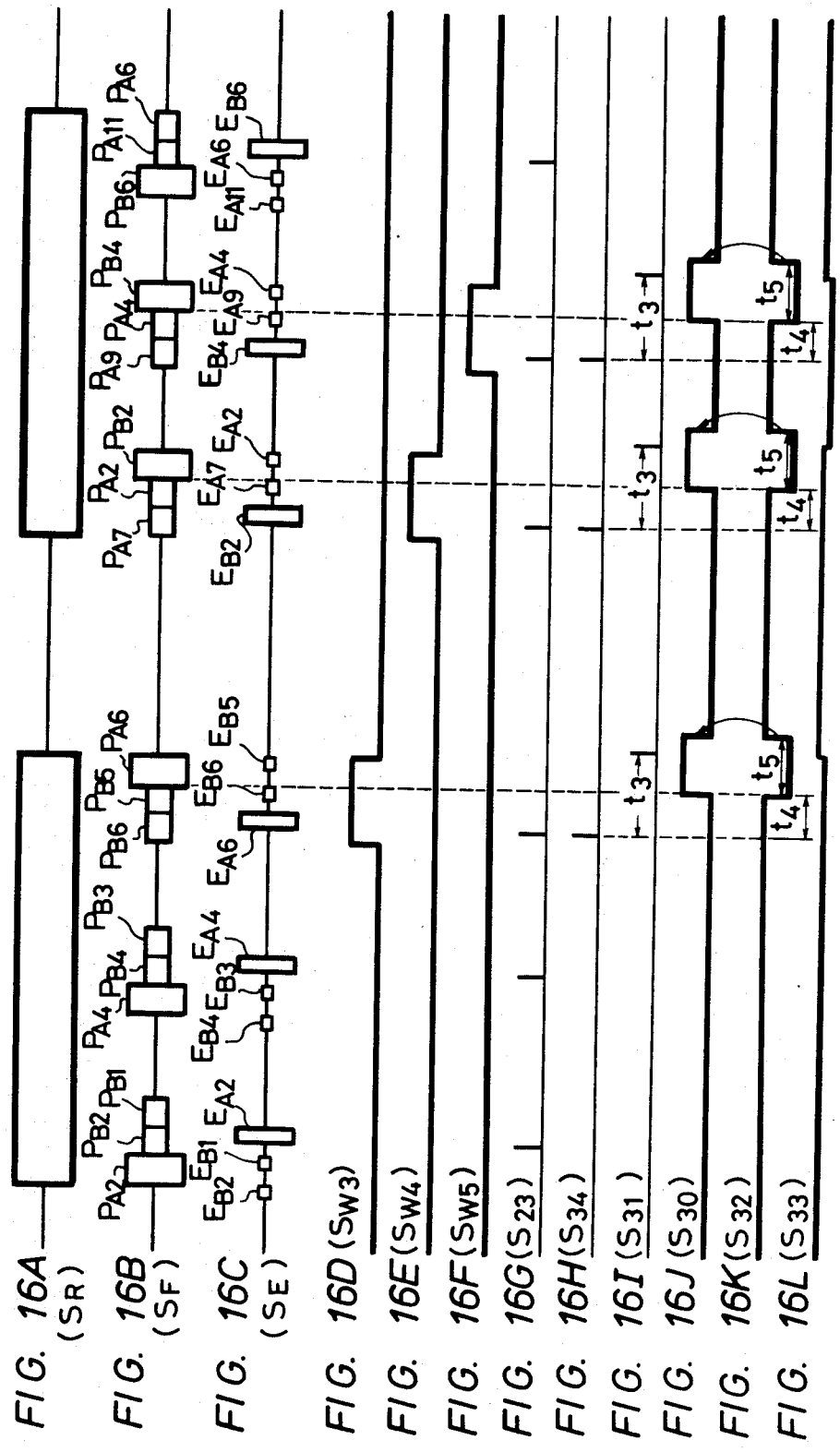

METHOD AND APPARATUS FOR REPRODUCING SIGNALS HAVING IMPROVED ROTARY HEAD TRACKING CONTROL

BACKGROUND OF THE INVENTION

1. Field of the Invention

This invention relates to a method and apparatus for reproducing signals recorded in a plurality of slant tracks on a recording medium and, more particularly, relates to a method and apparatus for reproducing signals containing a digital information signal and a pilot signal using a rotary head and employing the pilot signal to control a tracking alignment of the rotary head.

2. Description of the Prior Art

When a video signal and an audio signal are recorded on a magnetic tape by a helical-scan rotary head to form one slant track by one slant track thereon at every unit time and then they are reproduced, it is known that the video signal and audio signal are recorded and reproduced in pulse-code modulated (PCM) form. The reason for this is that if the signals are pulse-code modulated, the recording and reproducing thereof can be made with high quality.

In this case, tracking control for controlling the rotary head to accurately trace the recorded tracks upon playback is typically carried out such that a control signal that has been recorded along one side edge of the magnetic tape in its width direction by a fixed head is reproduced by the fixed head and the reproduced control signal and the rotary phase of the rotary head are made constant in phase relation.

This known control method requires the use of a special fixed magnetic head for the tracking control. The provision of such fixed magnetic head has a disadvantage that when the recording and reproducing apparatus is desired to be compact in size, its mounting space proposes a problem.

One approach to overcoming the disadvantage by use of the fixed head is a proposed tracking control method that does not use such fixed magnetic head but uses only the reproduced output signal from the rotary magnetic head to carry out the tracking control for the rotary head. This tracking control method is disclosed in, for example, U.S. patent application Ser. Nos. 560,958 filed on Dec. 13, 1983, 584,313 filed on Feb. 28, 1984 and 693,270 filed on Jan. 22, 1985 and assigned to the assignee hereof.

This tracking control method relies upon the fact that it is easy to time-compress and time-expand the PCM signal and hence it is not necessary to record and reproduce the PCM signal continuously in time, unlike an analog signal. Hence, the PCM signal and another different signal can easily be recorded on separate regions of each of the plurality of slanted tracks.

When the PCM signal is time-compressed and magnetically recorded on a recording medium by a plurality of rotary heads to form slanted tracks with no guard bands between adjacent tracks, a plurality of tracking control pilot signals are recorded in the longitudinal direction in each track to form a record region independent from the record region for the PCM signal. Upon playback, the recorded track is traced by the rotary head having a tracing width greater than the track width, and the tracking of the rotary head is controlled by the pilot signals reproduced from the tracks adjacent the track being traced by the rotary head.

Such tracking control method is required to be stabilized regardless of the characteristic of the magnetic tape used as a recording medium and the sensitivity of the rotary head.

OBJECTS AND SUMMARY OF THE INVENTION

Accordingly, it is an object of the present invention to provide an improved method and apparatus for reproducing signals recorded in a plurality of slant tracks on a recording medium.

It is another object of the present invention to provide an improved method and apparatus for reproducing signals recorded in a plurality of slant tracks on a recording medium by employing a tracking control system using a pilot signal recorded at a predetermined area on the tracks.

According to the aspect of the present invention, there is provided a method for reproducing signals recorded in a plurality of slant tracks on a recording medium by a rotary head, the signals in the tracks containing a digital information signal in a first predetermined area on said slant tracks and a tracking control signal including a tracking pilot signal and an erase signal in a second predetermined area, comprising the steps of:

reproducing the pilot signal at said second predetermined area from both tracks adjacent said track being traced;

comparing the level of said tracking pilot signals reproduced from said adjacent tracks;

generating a tracking signal in response to said level comparison;

controlling a tracking alignment of the rotary head in response to said tracking signal;

detecting the level of said tracking control signal recorded in said second area; and adjusting the level of the tracking signal in response to said level detection.

According to another aspect of the present invention, there is provided an apparatus for reproducing signals recorded in a plurality of slant tracks on a recording medium by a rotary head, the signals in the tracks containing a digital signal in a first predetermined area on said slant tracks and a tracking control signal including a tracking pilot signal and an erase signal in a second predetermined area, comprising:

means for reproducing the pilot signal at said second predetermined area from both tracks adjacent said track being traced;

means for comparing the levels of said tracking pilot signals reproduced from said adjacent tracks;

means for generating a tracking signal in response to said comparing means;

means for controlling a tracking alignment of the rotary head in response to said tracking signal;

means for detecting the level of said tracking control signal recorded in said second predetermined area; and means for adjusting the level of the tracking signal in response to a level detected by said detecting means.

The above and other objects, features and advantages of the present invention will become apparent from the following detailed description of illustrative embodiments thereof to be read in conjunction with the accompanying drawings, throughout which like references designate the same elements and parts.

BRIEF DESCRIPTION OF THE DRAWINGS

FIG. 2 is a diagram showing an example of a rotary head assembly used in FIG. 1;

FIG. 3 is a representation of an outline of a recorded track pattern of this invention;

FIGS. 4A to 4V are respectively signal waveform diagrams useful for explaining the recording operation of FIG. 1;

FIGS. 5A to 5Q are respectively signal waveform diagrams useful for explaining the operation of normal playback mode;

FIGS. 6A to 6R are respectively signal waveform diagrams useful for explaining the playback operation with tape speed twice the normal tape speed;

FIGS. 7A to 7T are respectively signal waveform diagrams useful for explaining the playback operation with tape speed three times the normal tape speed;

FIGS. 8A to 8I and FIGS. 9A to 9G are respectively signal waveform diagrams useful for explaining the playback operation of FIG. 1;

FIGS. 10, 11 and 14 are respectively diagrams useful for explaining the present invention;

FIGS. 13A to 13H and FIGS. 16A to 16L are respectively signal waveform diagrams useful for explaining the operations of FIGS. 12 and 15.

DESCRIPTION OF THE PREFERRED EMBODIMENTS

Now, the present invention will hereinafter be described in detail with reference to FIGS. 1 to 16

Figure 1B:
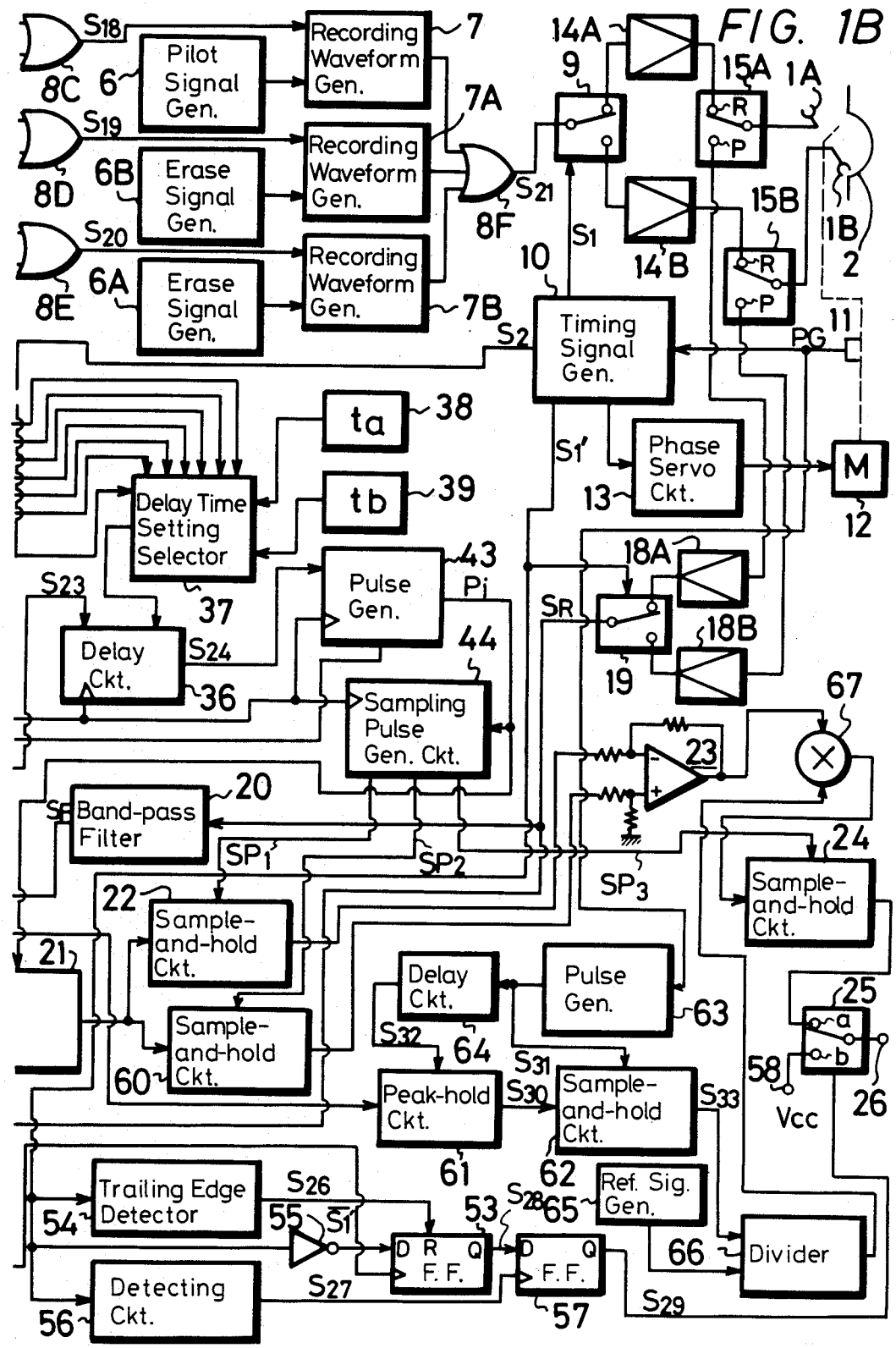
FIG. 1 (formed of FIGS. 1A and 1B) is a block diagram showing a first embodiment of an apparatus for reproducing signals according to the present invention.

FIG. 1 (formed of FIGS. 1A and 1B) schematically shows a circuit arrangement of a first embodiment of the present invention in which only the circuit construction is shown that records a tracking pilot signal and an erase signal that are directly concerned with the present invention and then changeably reproduces the tracking pilot signal and the erase signal between the normal playback mode and a variable tape speed playback mode, such as two or three times the normal tape speed. Thus, the circuit arrangement for recording and reproducing the information signal, such as a PCM signal, for example, is omitted, because it has no direct relation to the present invention.

Referring to FIGS. 1A and 1B, rotary heads 1A and 1B are arranged in contact with a magnetic tape 2, which is used as the recording medium. The rotary heads 1A and 1B are mounted on the periphery of a tape guide drum 3 with an equal angular distance, namely, 180°, as shown in FIG. 2. In this embodiment, the magnetic tape 2 is wrapped around the outside of tape guide drum 3 at its peripheral portion with an angular spacing or range less than 180°, for example, an angular spacing of 90°. The rotary heads 1A and 1B are rotated at 30 revolutions per second in the direction shown by an arrow 4H and the tape 2 is driven in the direction shown by an arrow 4T at a predetermined speed, so that slant magnetic tracks 5A and 5B are respectively formed on the magnetic tape 2 one by one by the rotary heads 1A and 1B in a so-called overlapped writing state, as shown in FIG. 3. That is, the width (tracing width) W of the head gap is selected to be greater than the track width. In this case, the width directions of the gaps of the rotary heads 1A and 1B are made different from each other relative to the direction perpendicular to their tracing direction. In other words, the so-called azimuth angles of the rotary heads 1A and 1B are selected to be different from each other to take advantage of the azimuth effect to cancel cross-talk.

It then follows that there occurs a period in which neither of the two rotary heads 1A and 1B are in contact with the magnetic tape 2, and this period corresponds to the angular range of 90° in this embodiment. If this noncontact period is used to perform the addition of redundant data during recording and to perform error correction and the like during playback, it is possible to simplify the apparatus.

Referring back to FIGS. 1A and 1B, a pilot signal oscillator or generator 6 is provided which produces a tracking pilot signal P, which has a frequency $f_0$ selected to be, for example, about 200 KHz with relatively large azimuth loss or the azimuth loss being effective and is recorded at a relatively high level. If the linearity between tracking phase displacement and a reproduced pilot signal output is ensured, the frequency $f_0$ of the tracking pilot signal P is desired to be a frequency presenting a relatively small amount of azimuth loss.

An erase signal generator 6A is provided which produces an erase signal E to erase the previously recorded pilot signal, because when a new information is recorded on a magnetic tape on which the information was previously recorded while erasing the previous recorded information, everything must be erased since each record track is not always identical in location with respect to the previous corresponding record track. The frequency $f_1$ of the erase signal E is selected to be, for example, around 700 KHz, which is sufficiently distant from the frequency $f_0$ of the pilot signal and has a relatively large azimuth loss. The recording level thereof is selected to be sufficiently high to erase the pilot signal P. As will be described more fully hereinbelow, the erase signal E is also used as a position detecting signal that detects the position of the pilot signal.

An erase signal generator 6B is also provided that produces another erase signal $E_0$, which is different from the above-noted erase signal E. Preferably, the erase signal $E_0$ has a high erasing ratio relative to both the pilot signal P and to the erase signal E when they are recorded in the overlapped state. The frequency $f_2$ of erase signal E is selected to be, for example, around 2 MHz.

Recording waveform generators 7, 7A, and 7B respond to outputs from edge detecting circuits 8A and 8B that detect an edge portion, for example, a trailing edge, of a delay signal associated with a pulse PG, which will be described in detail in the following. The recording waveform generators 7 and 7A, respectively, receive the pilot signal P and the erase signal $E_0$ from pilot signal and erase signal generators 6 and 6B and, in accordance with the number of the pilot signal P and the erase signal $E_0$ recorded per track and the manner in which they are arranged in the track, generate the pilot signal P and the erase signal $E_0$ having a predetermined pulse width tp. In this case, tp represents the recording time of each of pilot signal P and erase signal $E_0$. The recording time of the erase signal $E_0$ per recording area represents a continuous time tp in the track 5A, while in the track 5B such time tp represents the sum of the time intervals of two distant places. The recording waveform generator 7B receives the erase signal E from the erase signal generator 6A and produces at every predetermined time interval T1 the erase signal E having a predetermined time ½tp, which thereby indicates the number and arrangement of the erase signals E being recorded per track. An OR circuit 8F processes logically the outputs from the recording waveform generators 7, 7A, and 7B. A switching circuit 9 changes over the signal fed in from the rotary heads 1A and 1B in response to a switching signal $S_1$, the waveform of which is shown in FIG. 4A, which is generated from a timing signal generator 10. The timing signal generator 10 is supplied with a pulsed signal PG having a frequency of 30 Hz, which is indicative of the rotary phase of the rotary heads 1A and 1B, that is produced from a pulse generator 11 in synchronism with the revolution of a drive motor 12, which rotates the rotary heads 1A and 1B. The 30 Hz frequency pulsed signal from the timing signal generator 10, derived from the pulsed signal PG, also is supplied to a phase servo circuit 13, and the rotary phase of the motor 12 is controlled by a servo signal output therefrom.

The pilot signal and the like from the switching circuit 9, which is changed over in response to the switching signal $S_1$ from the timing signal generator 10, are amplified either by an amplifier 14A or 14B and then supplied to a contact R of respective switching circuit 15A or 15B and fed through the movable contact arm to the rotary head 1A or 1B, respectively, and thereby recorded on the magnetic tape 2. The movable contact arms of the switching circuits 15A and 15B are connected to the contacts R during recording while are connected to the contacts P during reproduction.

An output signal $S_2$, the waveform of which is shown in FIG. 4C, from the timing signal generator 10 is supplied to a delay circuit 16, in which it is delayed by a time corresponding to the distance of the mounting positions between the rotary heads 1A, 1B and the pulse generator 11 and response delays introduced by other system elements. The output signal from the time delay circuit 16 is a delayed signal $S_3$ supplied to the input side of the edge detecting circuit 8A, which detects a selected one or the other of the edge portions. In this embodiment, the trailing edge of this signal is used as a reference for recording the pilot signal P. The trailing edge of the signal $S_3$, the waveform of which is shown in FIG. 4D, delayed by the delay circuit 16 is made coincident with the time at which the first rotary head will come into contact with the magnetic tape 2 during one revolution period.

Pulse producing circuits 17A, 17B, and 17C provide respecitvely delay times T1, corresponding to each time duration of the pilot signal P and erase signals E and $E_0$ that are recorded on one track, T2, corresponding to two T1, and T, corresponding to a one-half rotation period of a rotary head. A pulse producing circuit 17D has a time delay of Tp and a pulse producing circuit 17E has a time delay of ½tp. A signal $S_4$, the waveform of which is shown in FIG. 4E, produced by the circuit 17A is supplied to the edge detecting circuit 8A, a signal $S_5$, the waveform of which is shown in FIG. 4F, produced by the circuit 17B is supplied to the edge detecting circuit 8B, and a signal $S_6$, the waveform of which is shown in FIG. 4G, produced by the circuit 17C is also supplied to the edge detecting circuit 8B. Signals $S_7$ and $S_8$, the waveforms of which are shown in FIGS. 4H and 4I, respectively, which were delayed by times T1 and T2 in the circuits 17A and 17B, respectively, are fed to the edge detecting circuits 8B and 8A.

Signals $S_9$ and $S_{10}$, whose waveforms are shown in FIGS. 4J and 4K, respectively, from the respective edge detecting circuits 8A and 8B are supplied to pulse producing circuits 17D and 17E, wherein they are delayed by times tp and ½tp to form signals $S_{11}$ and $S_{12}$, respectively. The waveforms of signals $S_{11}$ and $S_{12}$ are shown in FIGS. 4L and 4M, respectively. The signal $S_{11}$ is fed to one input terminal of an OR gate 8C and also fed to the circuit 17E, in which it is delayed by a time ½tp to form a signal $S_{13}$, whose waveform is shown in FIG. 4N. The signal $S_{13}$ is fed to one input terminal of a second OR gate 8D and also fed to the delay circuit 17E, in which it is delayed by time ½tp to form a signal $S_{14}$, whose waveform is shown in FIG. 4O. This signal $S_{14}$ is supplied to the circuit 17E, in which it is delayed by a time ½tp to form a signal $S_{15}$ fed to another input terminal of the second OR gate 8D. The waveform of signal $S_{15}$ is shown in FIG. 4P.

The signal $S_{12}$ is fed to one input terminal of a third OR gate 8E to another input of which is supplied with the signal $S_{14}$ and is also fed to the circuit 17D, in which it is delayed by time tp to form a signal $S_{16}$ that is supplied to another input terminal of the second OR gate 8D and also supplied to the circuit 17D, in which it is delayed by a time tp to form a signal $S_{17}$ that is fed to another input terminal of the OR gate 8C. The waveforms of signals $S_{16}$ and $S_{17}$ are shown in FIGS. 4Q and 4R, respectively.

Output signals $S_{18}$, $S_{19}$, and $S_{20}$ from the OR gates 8C, 8D and 8E, respectively, are fed to the recording waveform generating circuits 7, 7A, and 7B to operate as the respective gating signals thereof, so that the pilot signal P and the erase signals $E_0$ and E from the generators 6, 6B, and 6A are respectively supplied through the recording waveform generating circuits 7, 7A, and 7B and then developed at the output side of the three-input OR gate 8F as a composite signal $S_{21}$, whose waveform is shown in FIG. 4V. The waveforms of signals $S_{18}$, $S_{19}$, and $S_{20}$ are shown in FIGS. 4S, 4T, 4U, respectively.

In regard to the playback mode, amplifiers 18A and 18B are supplied with the reproduced output signals from the corresponding rotary heads 1A and 1B when the movable contact arms of switching circuits 15A and 15B are connected to the respective contacts P during playback. The outputs from the both amplifiers 18A and 18B are supplied to respective fixed contacts of a switch 19. On the basis of a 30 Hz switching signal $S_1'$ produced by the timing signal generator 10 and shown in FIG. 5A, FIG. 6A and FIG. 7A, the switch 19 is alternately changed in position to connect one fixed contact during a one-half period of rotation including the tape contact period of the rotary head 1A and to connect the other fixed contact during one-half rotation period that includes the tape contact period of the rotary head 1B, similar to the recording mode.

A narrow bandwidth band-pass filter 20 has a center pass frequency $f_0$ that passes therethrough only the pilot signal P of the reproduced output signal fed through switch 19. A peak-hold circuit 21 holds the peak value of the output from the band-pass filter 20 in order to enhance the response characteristic thereof and sample-and-hold circuits 22 and 60 sample and hold the peak value thus held in the peak-hold circuit 21. A subtracter 23 subtracts the respective outputs of the sample-and-hold circuits 22 and 60. The sample-and-hold circuits 22 and 60 sample and hold a crosstalk component of the two pilot signals derived, in a first case, from both the end portions and the center portions of tracks adjacent the track being traced during the normal playback mode, in a second case, from the center portion or end portion of the track being traced during playback at a tape speed twice that of the normal playback mode, and in a third case, from the center portions or both end portions of the tracks adjacent the track being traced during a playback mode at a tape speed three times that of the normal playback mode, as will be described hereinbelow.

A peak-hold circuit 61 peak-holds the output from the band-pass filter 20 and a sample-and-hold circuit 62 samples and holds the output from the peak-hold circuit 61. A pulse generator 63 generates a sampling pulse to the sample-and-hold circuit 62 in synchronism with the pulse generated from the pulse generator 11. A delay circuit 64 is provided to delay the output from the pulse generator 63 by a predetermined delay time and the output from this delay circuit 64 is supplied to the peak-hold circuit 61 as a latch pulse thereof. A reference signal generator 65 generates a reference signal and a divider 66 divides the reference signal derived from the reference signal generator 65 by using the output from the sample-and-hold circuit 62. A multiplier 67 multiplies the divided output from the divider 66 with the subtracted output from the subtracter 23. As will be described hereinbelow, the reference level is divided by the output from the sample-and-hold circuit 62 and multiplied with the subtracted outputs of the respective outputs of the sample-and-hold circuits 22 and 60 thereby to produce at the output side of the multiplier 67 an output whose level is always made constant. That is, it is possible to carry out a so-called AGC (automatic gain control) operation which automatically adjusts the loop gain constant.

A sample-and-hold circuit 24 samples and holds the multiplied output fed in from the multiplier 67. The timing of the sampling pulse supplied to the sample-and-hold circuit 24 may be desired one so long as it follows the sampling pulse which is fed to the sample-and-hold circuit 60.

Then, the output from the sample-and-hold circuit 24 is delivered through a switching circuit 25 to an output terminal 26 as the tracking control signal.

In order to form the necessary sampling pulses for the sample-and-hold circuits 22, 60 and 24, a narrow band band-pass filter 29 with a center pass frequency $f_1$ is provided at the output stage of the switching circuit 19 to derive only the erase output E from the reproduced output. The output signal $S_E$ from the band-pass filter 29 is supplied to a waveform shaping circuit 30, in which its wave is reshaped to produce an output signal $S_{22}$. The waveform of signal $S_E$ is shown in FIGS. 5K, 6I, and 7K, and the waveform of output signal $S_{22}$ is shown in FIGS. 5L, 6J, and 7L.

A leading edge detector 31 detects the leading edge of the output signal $S_{22}$ from the waveform shaping circuit 30 and at every one-half rotation period of the rotary head assembly, the leading edge of the erase signal is detected by the leading edge detecting circuit 31, as will be described later. The output signal from the leading edge detecting circuit 31 is fed to a plurality of identical gate circuits $33_1$, $33_2$, $33_3$, $33_4$, $33_5$, and $33_6$. Window signals $S_{W1}$ to $S_{W6}$ generated by a window signal generating circuit 34 that may employ, for example, a counter, are used as the gating signals for the gate circuits $33_1$ to $33_6$, respectively. The window signal generating circuit 34 responds to the output signal $S_2$ of the timing signal generating circuit 10 to count a clock signal CLK supplied at a clock terminal 42, so that the window signal generating circuit 34 produces a window signal of a predetermined width that can cover at least both end edges of output signal $S_{22}$ from the waveform shaping circuit 30 in response to different playback modes. The waveforms of the window signals $S_{W1}$, $S_{W2}$, $S_{W3}$, $S_{W4}$, $S_{W5}$, and $S_{W6}$ are shown in FIGS. 5C, 5D, 5E, 5F, 5G, and 5H, respectively.

More specifically, when the window signal generating circuit 34 receives a command signal to set the normal playback mode from a mode setting circuit 32, it produces all of the window signals $S_{W1}$ to $S_{W6}$ in sequence; when the window signal generating circuit 34 receives a command signal to set the playback mode at a tape speed twice that of normal, it produces only the window signals $S_{W2}$ and $S_{W5}$ or $S_{W3}$ and $S_{W4}$; and when the window signal generating circuit 34 receives a command signal to set the playback mode at a tape speed three times that of normal, it produces only the window signals $S_{W2}$, $S_{W5}$, and $S_{W1}$, or $S_{W3}$, $S_{W4}$, and $S_{W6}$.

Accordingly, only the edge portion of the signal $S_{22}$ that enters the periods of the window signals $S_{W1}$ to $S_{W6}$ is produced at the output sides of the gate circuits $33_1$ to $33_6$ and these edge portions are fed to an OR gate 35 that produces an output signal $S_{23}$, the waveform of which is shown in FIGS. 5M, 6K, and 7M, which is fed to one input terminal of a time delay circuit 36. The time delay circuit 36 may include a counter, for example, that is connected to use the signal $S_{23}$ as a start pulse.

A pair of delay time setting circuits 38 and 39 are provided. The delay time setting circuit 38 sets a delay time ta from the time of occurrence of the pulse in the signal $S_{23}$ during the playback modes in which the tape speed is twice and three times that of normal tape speed for sampling the pilot signal. Similarly, the delay time setting circuit 39 sets a delay time tb following an occurrence of the pulses in the signal $S_{23}$ during the playback mode in which the tape speed is twice that of normal tape speed for sampling the pilot signal.

The respective delay times ta and tb set by the delay time setting circuits 38 and 39 are supplied to a delay time setting selector 37 and are individually selected by the window signals $SW_1$ to $SW_6$ fed thereto from the window signal generating circuit 34. The thus selected delay time is supplied to the delay circuit 36 at another input terminal thereof. The delay circuit 36, that may comprise a counter, uses the signal $S_{23}$ as a start signal to deliver the clock signal CLK supplied at the clock terminal 42 if the delay is not necessary, or to count the clock signal CLK only during the period of time thus set, if a delay is necessary. At the end of the count operation, the delay circuit 36 produces an output signal $S_{24}$ having a narrow pulse width. The waveform of the signal $S_{24}$ is shown in FIGS. 5N, 6L, and 7N.

A pulse generator 43 that may employ, for example, a counter, counts the pulses of the clock signal CLK also supplied thereto from the clock terminal 42 by using the signal $S_{24}$ from the delay circuit 36 as a trigger pulse. The pulse generator 43 then produces a pair of pulses Pi (FIGS. 5O and 7O) at a predetermined interval during the normal playback mode and during the playback mode in which the tape speed is three times that of normal, in a first case. In a second case, one (FIGS. 6M, 6P and FIG. 7R) of the pair of pulses Pi corresponds to each pilot signal to be detected during the playback mode in which the tape speed is twice that of normal and in the playback mode in which the tape speed is three times that of normal. The pulse Pi is supplied to the peak-hold circuit 21 and also to a sampling pulse generator circuit 44 that may employ, for example, a D flip-flop circuit or the like. The sampling pulse generator circuit 44 produces sampling pulse signals $SP_1$ and $SP_2$ which will be fed to the sample-and-hold circuits 22 and 60, respectively, in response to the pulse Pi.

Reference numeral 51 designates a comparing circuit which is connected to the output side of the band-pass filter 29 and compares the output signal, which is in effect a reproduction of the erase signal E, with a reference level from a reference voltage source 52. If the reproduced output signal exceeds the reference level, the comparing circuit 51 produces an output signal $S_{25}$, whose waveform is shown in FIG. 8C, that is fed to the clock terminal of a D flip-flop circuit 53 as the latch pulse thereof. An edge detecting circuit 54 detects the trailing edge of the switching signal $S_1'$ derived from the timing signal generator 10, so that, in synchronism with the trailing edge of the switching signal $S_1'$, the trailing edge detector 54 produces and supplies an output signal $S_{26}$ (FIG. 8E) to the reset terminal R of the flip-flop circuit 53. Additionally, the switching signal $S_1'$ is inverted by an inverter 55 to become a signal $\overline{S_1'}$ that is fed to the D input terminal of the flip-flop circuit 53. The waveform of signal $\overline{S_1'}$ is shown in FIG. 8F.

Another detecting circuit 56 detects the leading edge of the switching signal $S_1'$, so that in synchronism with the leading edge of the switching signal $S_1'$ the detecting circuit 56 produces an output signal $S_{27}$, whose waveform is shown in FIG. 8G, that is fed to a clock terminal of another D flip-flop circuit 57. Supplied to the D input terminal of the flip-flop circuit 57 is an output signal $S_{28}$, whose waveform is shown in FIG. 8H, from flip-flop circuit 53 and an output signal $S_{29}$, whose waveform is shown in FIG. 8I, from the flip-flop circuit 57 is fed to the switch 25 to act as the switching control signal thereof. As will be described hereinbelow, when the control signal $S_{29}$ is at one level, for example, a high level (H), the movable contact of the switch 25 is connected to a contact a so as to deliver the tracking control signal to the output terminal 26, thereby to carry out normal operation, whereas when the control signal $S_{29}$ is at other level, for example, a low level (L), the movable contact of the switch 25 is connected to a contact b to deliver at the output terminal 26 a constant potential or voltage Vcc supplied at a terminal 58. This constant voltage Vcc is then supplied through the output terminal 26 to a capstan servo system (not shown) as the tracking control signal, whereby the rotary head during the tracing operation is forced into the normal tracking state.

The above-described operation of the inventive circuit of FIG. 1 can be more fully described with reference to FIGS. 4 to 11.

During recording, in response to the pulse PG produced by the pulse generator 11 in order to represent the rotary phase of the rotary heads 1A and 1B, the timing signal generator 10 produces the signal $S_2$ shown in FIG. 4C. The signal $S_2$ is fed to the delay circuit 16 and delayed by the predetermined time $T_R$ and the delay circuit 16 then produces at its output side the signal $S_3$, shown in FIG. 4D. As described above, the signal $S_3$ is fed directly as well as through the circuits 17A and 17B to the edge detecting cirucit 8A, in which the trailing edge thereof is detected. In synchronism with the trailing edge of the signal $S_3$ the edge detecting circuit 8A produces the narrow pulse width output signal $S_9$, shown in FIG. 4J. The signals $S_5$, $S_6$, and $S_7$ from the circuits 17B, 17C, and 17A, respectively, are supplied to the edge detecting circuit 8B, in which the trailing edges thereof are detected. Thus, in synchronism with the trailing edges of the signals $S_5$, $S_6$, and $S_7$, the edge detecting circuit 8B produces an output signal $S_{10}$, the waveform of which is shown in FIG. 4K. The signals $S_9$ and $S_{10}$ are supplied to pulse producing circuits 17D and 17E, respectively, in which they are delayed along with the other signal inputs thereto, as described hereinabove. The waveforms of the delayed output signals produced by the delay circuits 17D and 17E are shown in FIGS. 4L to 4R. These output signals are fed to the OR circuits 8C, 8D, and 8E to produce the output signals $S_{18}$, $S_{19}$, and $S_{20}$, respectively, the waveforms of which are shown in FIGS. 4S to 4U. The signals $S_{18}$, $S_{19}$ and $S_{20}$ form the basis for recording start references for the pilot signal P and the erase signals $E_0$ and E, respectively, for rotary heads 1A and 1B are determined.

The signals $S_{18}$, $S_{19}$, and $S_{20}$ are respectively supplied to the recording waveform generating circuits 7, 7A, and 7B, so that the recording waveform generating circuit 7 allows the pilot signal P, which is produced by the pilot signal generator 6, to pass therethrough with a predetermined time interval, shown in FIG. 4S, only during the predetermined time tp in synchronism with the signal $S_{18}$. Similarly, the recording waveform generating circuit 7A allows the erase signal $E_0$, which is produced by the erase signal generator 6B, to pass therethrough with a predetermined time interval, shown in FIG. 4T only during the predetermined time interval tp in synchronism with the signal $S_{19}$ supplied thereto, and the recording waveform generating circuit 7B allows the erase signal E, which is produced by the erase signal generator 6A, to pass therethrough with a predetermined time interval, shown in FIG. 4U only during the predetermined time $\frac{1}{2}$tp in synchronism with the signal $S_{20}$. The output signals from the recording waveform generating circuits 7, 7A, and 7B are added together by the OR circuit 8F to produce the signal $S_{21}$, the waveform of which is shown in FIG. 4V.

As an operative example, assume that the track 5B2, as shown in FIG. 3, is to be recorded by the rotary head 1B, then, the first, second, and third pulses of the signal $S_{18}$ (FIG. 4S) correspond respectively to the pilot signals $P_{A2}$, $P_{A4}$, and $P_{A6}$; the first, second, and third pulses of the signal $S_{19}$ (FIG. 4T) correspond respectively to the erase signals $E_0$ adjacent both sides of the erase signals $E_{A2}$ and $E_{A4}$ and one side of the erase signal $E_{A6}$; and the first, second, and third pulses of the signal $S_{20}$ (FIG. 4U) correspond respectively to the erase signals $E_{A2}$, $E_{A4}$, and $E_{A6}$ adjacent the above-noted erase signals $E_0$. Thus, the composite signals formed of $P_{A2}$, $E_0$, $E_{A2}$, $E_0$; and $P_{A4}$, $E_0$, $E_{A4}$, $E_0$; and $E_{A6}$, $E_0$, $P_{A6}$ are each produced at the output side of the OR gate 8F.

Further in this example, assume that the track 5A2 in FIG. 3 is to be recorded by the rotary head 1A, then the first, second, and third pulses of signal $S_{18}$ (FIG. 4S) respectively correspond to the pilot signals $P_{B2}$, $P_{B4}$, and $P_{B6}$; the first, second, and third pulses of the signal $S_{19}$ (FIG. 4T) respectively correspond to the erase signals $E_0$ that are adjacent one side of the erase signals $E_{B2}$ and $E_{B4}$ and to both sides of the erasing signal $E_{B6}$; and the first, second and third pulses of the signal $S_{20}$ (FIG. 4U) respectively correspond to the erase signals $E_{B2}$, $E_{B4}$, and $P_{B6}$ that are adjacent the above-noted erase signals $E_0$. Thus, the composite signals formed of $E_{B2}$, $E_0$, $P_{B2}$; $E_{B4}$, $E_0$, $P_{B4}$; and $P_{B6}$, $E_0$, $E_{B6}$, $E_0$ are each produced in this case at the output side of the OR gate 8F.

At the same time, the timing signal generator 10 produces the switching signal $S_1$ (FIG. 4A) in response to the pulse PG produced by the pulse generator 11, which is synchronized with the rotation of the rotary heads 1A and 1B so that, as shown in FIGS. 4A and 4B, within the half rotation period tA in which the signal $S_1$ is high in level, the rotary head 1A contacts the magnetic tape 2, while within the half rotation period tB in which the signal $S_1$ is low in level, the rotary head 1B contacts the magnetic tape 2. Then, the movable contact of the switch 9 is connected as shown in FIG. 1 during the period tA and connected in the state opposite to that shown during the period tB, in response to the switching signal $S_1$, thereby changing over the connection to the rotary heads 1A and 1B.

When the movable contact of the switch 9 is in the state opposite to that shown in FIG. 1, the signal $S_{21}$ produced by the OR gate 8F is supplied through the amplifier 14B and the contact R of the switch 15B to the rotary head 1B, so that at the beginning, center, and end of the period in which the rotary head 1B contacts the magnetic tape 2, during the period tB shown in FIG. 3, the signal $S_{21}$ is recorded at tracking signal recording regions $A_{T1}$ and $A_{T2}$, which are formed at both end portions in the longitudinal direction of the track 5B and which are equidistant from the central position in the longitudinal direction of the track 5B by 1 (corresponding to T1) with times $tp+\frac{1}{2}tp+\frac{1}{2}tp+\frac{1}{2}tp$ and time $\frac{1}{2}tp+tp+tp$. This signal $S_{21}$ is also recorded at a similar recording region $A_{T3}$ located at the central portion of the track 5B, with times $tp+\frac{1}{2}tp+\frac{1}{2}tp+\frac{1}{2}tp$.

When the movable contact of the switching circuit 9 is connected as shown in FIG. 1, the signal $S_{21}$ is supplied through the amplifier 14A and the contact R of the switch 15A to the rotary head 1A, so that at the beginning, center, and end of the period in which the rotary head 1A contacts the magnetic tape 2 during the period tA, the signal $S_{21}$ is recorded at like tracking signal recording region $A_{T1}$ and $A_{T2}$, which are formed at both end portions in the longitudinal direction of the track 5A equidistant from the central position in the longitudinal direction of the track 5A by 1 (corresponding to T1) with times $\frac{1}{2}tp+tp+tp$ and times $tp+\frac{1}{2}tp+\frac{1}{2}tp+\frac{1}{2}tp$. This signal $S_{21}$ is recorded also on like recording region $A_{T3}$, which is formed at the central portion of the track 5A with times $\frac{1}{2}tp+tp+tp$.

Although not shown in the drawings, in the period in which the pilot signal and the erase signals are not recorded, one segment of an audio PCM signal should be recorded as one track supplied through the amplifier 14A to the rotary head 1A during the period tA and supplied through the amplifier 14B to the rotary head 1B during the period tB and then recorded on recording regions $A_{P1}$ and $A_{P2}$ on the tracks 5A and 5B, respectively, except during the above-noted recording regions of the pilot signal.

The reproduction of the signals thus recorded will be described next.

Also in this playback mode, the motor 12 is applied with the drum phase servo by the phase servo circuit 13 similarly to the recording mode.

During the normal playback mode, the signals reproduced from the magnetic tape 2 by the rotary heads 1A and 1B are supplied through the contact P of the switch 15A and the amplifier 18A and the contact P of the switch 15B and the amplifier 18B, respectively, to the switch 19. The switch 19 is alternately changed over by the 30 Hz switching signal $S_1'$ (FIG. 5A) produced by the timing signal generator 10, similar to the operation in the recording mode, during the half rotation period tA that includes the tape contact period of the rotary head 1A and during the half rotation period tB that includes the tape contact period of the head 1B. Accordingly, the switch 19 provides an intermittent PCM signal segment SR, as shown in FIG. 5I. This signal SR is supplied to a playback processor (not shown) in which it is demodulated to the original PCM signal, which is supplied to a decoder (not shown), in which the data of each block is detected on the basis of a block synchronizing signal and in which error correction, de-interleave processing, and the like are carried out. The signal SR is then reconverted to an analog audio signal by a D/A (digital-to-analog) converter (not shown) and fed out as the output signal.

The tracking control operation will be carried out as follows.

As an operative example of tracking control, assume that the rotary head 1B has a tracing width W that includes the track 5B2, as represented by the two one-dot chain lines in FIG. 3. Then, the rotary head 1B traces the tracks 5A2 and 5A1 adjacent the track 5B2, so that, as shown in FIG. 3, in the region $A_{T1}$, the pilot signal $P_{A2}$ recorded on the track 5B2, the pilot signal $P_{B2}$ recorded on the adjacent track 5A2 and the pilot signal $P_{B1}$ that is recorded on the track 5A1 are reproduced. Similarly, in the region $A_{T3}$, the pilot signal $P_{A4}$ of the track 5B2, the pilot signal $P_{B4}$ that is recorded on the adjacent track 5A2 and the pilot signal $P_{B3}$ that is recorded on the track 5A1 are reproduced. Further, in the region $A_{T2}$, the pilot signal $P_{B6}$ that is recorded on the adjacent track 5A2, the pilot signal $P_{B5}$ that is recorded on the track 5A1 and the pilot signal $P_{A6}$ that is recorded on the track 5B2 are reproduced. At that time, the output signal reproduced by the rotary head 1B through the switch 19 is fed to the narrow bandwidth band-pass filter 20 having a center pass frequency $f_0$, from which only the pilot signal is derived as the output SF and which is then fed to the peak-hold circuit 21. The waveform of the output of the band-pass filter 20 is shown in FIG. 5J.

The output signal SR of the switch 19 is also fed to the band-pass filter 29, which produces the erase signal $S_E$ having a frequency $f_0$ (FIG. 5K) that is fed to the waveform shaping circuit 30 and formed as the signal $S_{22}$, as shown in FIG. 5L. The signal $S_{22}$ is fed to the leading edge detector 31, in which the leading edge thereof is detected and a corresponging output signal is fed to the six gate circuits $33_1$ to $33_6$.

The window signal generating circuit 34 produces in sequence the six window signals $S_{W1}$ to $S_{W6}$ (FIGS. 5C to 5H) in response to the signal $S_2$ (FIG. 5B) produced by the timing signal generator 10. These window signals, $S_{W1}$ to $S_{W6}$, are respectively supplied to the gate circuits $33_1$ to $33_6$ as the gate signals thereof, so that the gate circuits $33_1$ to $33_6$ produce output signals only during the respective periods of the window signals $S_{W1}$ to $S_{W6}$. Thus, the OR gate 35, which is connected to receive the output signals from the gates $33_1$ to $33_6$, produces an output signal $S_{23}$ having a narrow pulse width that coincides with the start of the signal $S_{22}$, more specifically, with the erase signal $S_E$, which in period tB is made up of $E_{A2}$, $E_{A4}$ and $E_{A6}$ and which in period tA is made up of $E_{B2}$, $E_{B4}$ and $E_{B6}$, as shown in FIG. 5M.

The signal $S_{23}$ is fed to the delay circuit 36, however, during normal playback mode the signal $S_{23}$ is identical with the center portion of the pilot signal to be sampled, so that it is not necessary to delay the signal $S_{23}$. Consequently, at such time, the delay time for the delay circuit 36 is not set by the selector 37, and the delay circuit 36 sequentially produces the signal $S_{24}$ that is identical with the signal $S_{23}$, as shown in FIG. 5N. The signal $S_{24}$ is fed to the pulse generator circuit 43 that is based on the signal $S_{24}$ produces a pair of pulses Pi, which correspond to each pilot signal that will be detected, as shown in FIG. 5O. The pair of pulses Pi are supplied to the sampling pulse generator circuit 44 and to the peak-hold circuit 21. Based on this pair of pulses Pi, the sampling pulse generator 44 generates the sampling pulses $SP_1$ and $SP_2$, as shown in FIGS. 5P and 5Q and also a third sampling pulse whose waveform is not shown, which then are fed to the sample-and-hold circuits 22, 60 and 24, respectively.

The pulse Pi obtained as mentioned above is supplied to the peak-hold circuit 21 and the sampling pulses $SP_1$, $SP_2$ and $SP_3$ formed on the basis of this sampling pulse Pi are supplied to the sample-and-hold circuits 22, 60 and 24, respectively.

Accordingly, during the period in which the track $5B_2$ is traced by the head 1B, as will be clear from FIG. 5, a first pulse $P_{i1}$ of the pulse Pi is placed in such a state that the crosstalk components of the pilot signals $P_{B2}$, $P_{B4}$ and $P_{B6}$ of the adjacent track $5A_2$ opposite to the transport direction shown by the arrow 4T (FIG. 3) are peak-held by the peak-hold circuit 21. The output from the peak-hold circuit 21 at that time is supplied to the sample-and-hold circuit 22 in which it is sampled by the sampling pulse $SP_1$ which is produced at the trailing edge of the first pulse $P_{i1}$ and then fed to one input terminal of the subtracter 23 as a tracking signal of an advanced phase.

A second pulse $P_{i2}$ of the pulse $P_i$ is placed in such a state that the crosstalk components of the pilot signals $P_{B1}$, $P_{B3}$ and $P_{B5}$ on the adjacent track $5A_1$ in the tape transport direction side are peak-held by the peak-hold circuit 21. The output from this peak-hold circuit 21 at that time is supplied to the sample-and-hold circuit 60 in which it is sampled by the sampling pulse $SP_2$ which is produced at the trailing edge of the second pulse $P_{i2}$ and then fed to the other input terminal of the subtracter 23 as the tracking signal of the delayed phase. Accordingly, the subtracter 23 subtracts the tracking signals corresponding to the pilot signals $P_{B2}$, $P_{B1}$; $P_{B4}$, $P_{B3}$ and $P_{B6}$, $P_{B5}$ in turn. The subtracted output signal from the subtracter 23 is supplied to one input terminal of the multiplier 67.

The output $S_F$ from the band-pass filter 20, namely, the pilot signal is supplied to the peak-hold circuit 61 in which the peak value thereof is held. As a result, at the output terminal of the peak-hold circuit 61, there is obtained a signal $S_{30}$ whose waveform is shown in FIG. 9C. The signal $S_{30}$ is supplied to the sample-and-hold circuit 62 in which it is sampled by a signal $S_{31}$ that is produced from a pulse generator 63 in synchronism with the pulse PG shown in FIG. 9D with an interval of predetermined times $t_0$, $t_1$ and $t_2$ and shown in FIG. 9E. Consequently, the sample-and-hold circuit 62 produces at its output terminal a signal $S_{33}$ shown in FIG. 9G. The peak-hold state of the peak-hold circuit 61 is released by a signal $S_{32}$ which is produced from the time delay circuit 64 with a predetermined delay time t in response to the signal $S_{31}$ from the pulse generator 63. The waveform of the signal $S_{32}$ is shown in FIG. 9F.

The signal $S_{33}$ from the sample-and-hold circuit 62 is supplied to the divider 66 in which the reference signal from the reference signal generating circuit 65 is divided by the signal $S_{33}$ and then the divided signal is fed to the other input terminal of the multiplier 67. As a result, at the output terminal of the multiplier 67, there is produced an output with a constant level even when the crosstalk components of the pilot signal is fluctuated in level by variations in the response characteristic of the tape, the sensitivity of the rotary head and so on.

Figure 10:
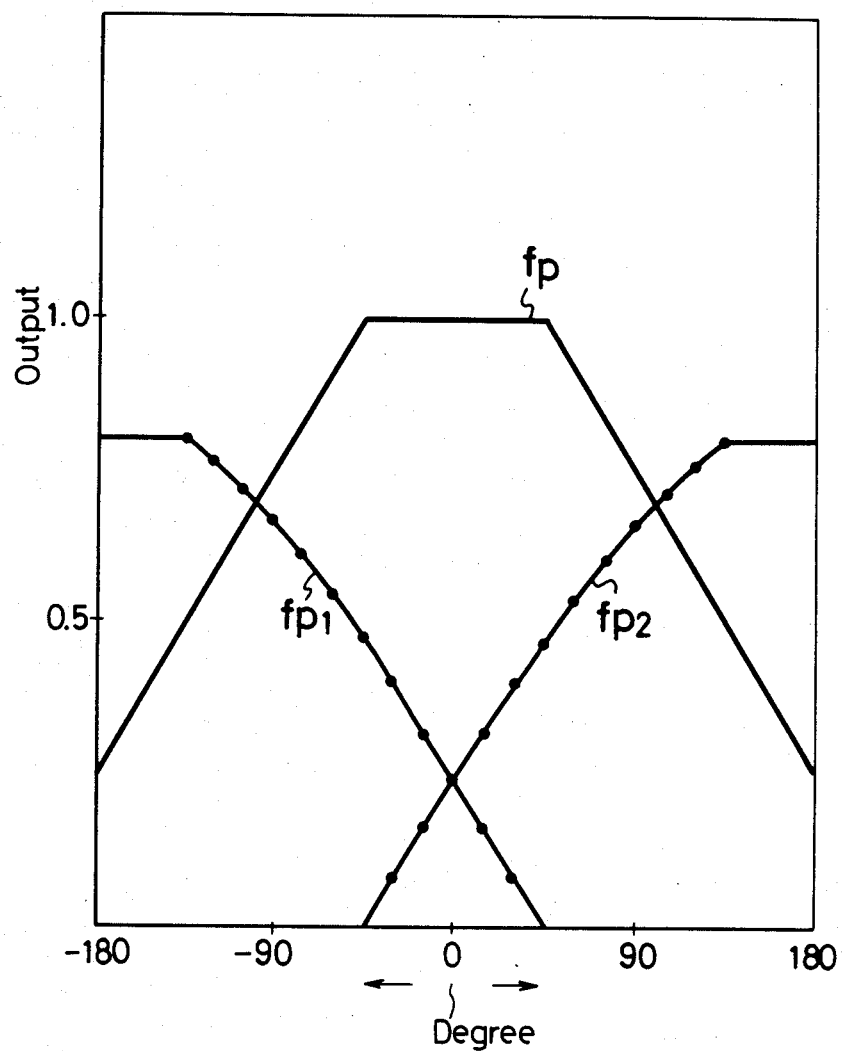

This will be described in detail with reference to FIGS. 10 and 11. FIG. 10 is a graph showing an example of the relation of the tracking phase to the pilot signal output of the track which is being traced and the crosstalk output of the pilot signals of the adjacent tracks. In FIG. 10, reference letter $f_p$ designates an output (corresponding to $P_{A2}$ of, for example, FIG. 9B) of the pilot signal on the track now being traced and which is produced at the side of the sample-and-hold circuit 62. Reference letter $f_{p1}$ designates a crosstalk (corresponding to $P_{B2}$ of, for example, FIG. 9B) of the pilot signal of the adjacent track produced at the side of the sample-and-hold circuit 22 and $f_{p2}$ a crosstalk (corresponding to $P_{B1}$ of, for example, FIG. 9B) of the pilot signal of the adjacent track produced at the side of the sample-and-hold circuit 60, respectively. When the phase of the tracking is 0°, the rotary head traces the track precisely without being displaced. The output $f_p$ lies at a certain constant value within a range where the tracking phase is ±45° around 0°. When the tracking phase becomes displaced from this range, the output $f_p$ is dropped rectilinearly with a certain inclination. The crosstalk $f_{p2}$ is increased gradually from zero to a certain value from the tracking phase being +45° to −135° and thereafter, it is saturated. Whereas, the crosstalk $f_{p1}$ is gradually increased from zero to a certain value from the tracking phase being −45° to +135° and thereafter, it is saturated. Accordingly, during the period in which the track $5B_2$ is traced by the rotary head, in a range in which the tracking phase is substantially from −100° to +100°, the pilot signals $P_{A2}$, $P_{A4}$ and $P_{A6}$ of the track $5B_2$ are peak-held by the peak-hold circuit 61. In a range in which the tracking phase is substantially from 100° to 180°, the crosstalks of the pilot signals $P_{B1}$, $P_{B3}$ and $P_{B5}$ of the adjacent track $5A_1$ are peak-held and in a range in which the tracking phase is substantially from −100° to −180°, the crosstalks of the pilot signals $P_{B2}$, $P_{B4}$ and $P_{B6}$ of the adjacent track $5A_2$ are peak-held, respectively.

However, if the characteristic of the magnetic tape and the sensitivity of the rotary head, etc. are scattered, the amounts of the crosstalks produced at the output sides of the sample-and-hold circuits 22 and 60 are varied, for example, are decreased to be ½ in some case.

A difference between these crosstalks $f_{p1}$ and $f_{p2}$, namely, the output of the subtracter 23 is varied as shown by a broken line a in FIG. 11. Accordingly, if the output having such characteristic is fed back as it is to the servo system at the side of the output terminal 26, the change of the inclination of the characteristic shown by the broken line a becomes the change of the servo characteristic (servo gain). As a result, when the characteristic of the magnetic tape and the sensitivity of the rotary head, etc. are scattered vehemently, there may be a fear that the servo system is oscillated, the external disturbance can not be suppressed and hence the intended servo characteristic will not be satisfied.

Hence, in accordance with this invention, the output from the subtracter 23 is not directly fed back to the servo system but such output is multiplied with a certain value and then fed back thereto. More specifically, the output $f_p$ of the pilot signal of the track being traced, which is produced at the output side of the sample-and-hold circuit 62 is supplied to the divider 66 in which the reference signal from the reference signal generating circuit 65 is divided by the output $f_p$ and then fed to the multiplier 67 and thereby multiplied with the subtracted output from the subtracter 23.

With respect to the $f_p$, $f_{p1}$ and $f_{p2}$, this operation will be expressed by the following expression.

$$\frac{\text{Ref}}{f_p} \times (f_{p2} - f_{p1}) \qquad (1)$$

In expression (1), Ref represents the level (corresponding to the output 1.0 in, for example, FIG. 10) of the reference signal derived from the reference signal generating circuit 65, $f_p$ the output level of the sample-and-hold circuit 62, and $(f_{p2}-f_{p1})$ the output level of the subtracter 23. In Eq. (1), in a range in which the tracking phase lies in a range from $-45°$ to $+45°$, as will be clear from FIG. 10, $f_p$ is substantially equal to Ref so that expression (1) becomes as $$\frac{\text{Ref}}{\text{Ref}} \times (f_{p2} - f_{p1}) = (f_{p2} - f_{p1}) \qquad (2)$$

That is, the output from the multiplier 67 is changed rectilinearly relative to $(f_{p2}-f_{p1})$ in a range in which the tracking phase is in a range from $-45°$ to $+45°$.

Further, in a range in which the tracking phase is in a range from $+45°$ to substantially $+100°$, as will be clear from FIG. 10, $f_{p1}=0$ is established so that expression (1) becomes as $$\frac{\text{Ref}}{f_p} \times f_{p2} \qquad (3)$$

From expression (3), it will be seen that as $f_p$ becomes small, the calculated value of expression (3) becomes large. In other words, near the range in which the tracking phase is in a range from $+45°$ to substantially $+100°$, the correction by the AGC (automatic gain control) is carried out so that the output from the multiplier 67 is varied rectilinearly.

Further, in a range in which the tracking phase lies from near substantially $+100°$ to near substantially $+180°$, as will be clear from FIG. 10, $f_{p1}=0$ is established and instead of $f_p$, $f_{p2}$ is peak-held, thus expression (1) becomes as $$\frac{\text{Ref}}{f_{p2}} \times f_{p2} = \text{Ref} \qquad (4)$$

In other words, in a range in which the tracking phase lies in a range from substantially $+100°$ to $+180°$, the output of the multiplier 67 is fixed to Ref.

Further, in a range in which the tracking phase lies in a range from $-45°$ to substantially $-100°$, as will be clear from FIG. 10, $f_{p2}=0$ is established so that expression (1) becomes as $$\frac{\text{Ref}}{f_p} \times (-f_{p1}) \qquad (5)$$

From expression (5), it will be seen that as $f_p$ becomes small, the calculated value of expression (5) becomes large. In other words, in a range in which the tracking phase lies in a range from $-45°$ to substantially near $-100°$, the correction by the AGC is carried out and the output from the multiplier 67 is varied rectilinearly.

Furthermore, in a range in which the tracking phase lies in a range from substantially near $-100°$ to $-180°$, as will be clear from FIG. 10, $f_{p2}=0$ and instead of $f_p$, $f_{p1}$ is peak-held so that expression (1) is modified as $$\frac{\text{Ref}}{f_{p1}} \times (-f_{p1}) = -\text{Ref} \qquad (6)$$

That is, in a range in which the tracking phase lies in a range from substantially $-100°$ to $-180°$, the output from the multiplier 67 is fixed to Ref.

These will be shown by a broken line b of FIG. 11. In FIG. 11, the broken line b indicates the characteristic from 0° to $+180°$, a substantially same characteristic is presented in a range from 0° to $-180°$.

Accordingly, even if the crosstalk output is varied, it is possible to realize a so-called AGC circuit wherein the servo gain becomes constant.

The constant output thus produced at the output side of the multiplier 67 is supplied to the sample-and-hold circuit 24, in which it is sampled by the sampling pulse SP$_3$ which is produced from the sampling pulse generating circuit 44 after the sampling pulse SP$_2$ was produced. Accordingly, from the sample-and-hold circuit 24, there is produced the multiplied output of the multiplier 67 as the tracking control signal. This output is supplied through a contact a of the switching circuit 25 to a capstan motor (not shown) from the output terminal 26. As a result, the tape transport amount is controlled so that when the head 1B traces the track 5B$_2$, the head 1B traces the two tracks 5A$_2$ and 5A$_1$ at the both sides of the track 5B$_2$ with the same tracing width. In other words, the head 1B traces the track 5B$_2$ under the state that the center position of the gap in the width direction of the head 1B becomes coincident with the central position of the track 5B$_2$.

Further, the similar control is carried out for other tracks. For instance, when the head 1A traces the track 5A$_2$, as shown by the right-hand portion of FIG. 5, the crosstalk components of the pilot signals $P_{A7}$, $P_{A9}$, $P_{A11}$; and $P_{A2}$, $P_{A4}$ and $P_{A6}$ from the tracks 5B$_3$, and 5B$_2$ at the both of the track 5A$_2$ are obtained, respectively. Accordingly, these are peak-held in turn by the peak-hold circuit 21 similarly as mentioned above. Then, the crosstalk components of the pilot signals $P_{A7}$, $P_{A9}$ and $P_{A11}$ are sampled by the sampling pulse SP$_1$ which is supplied from the sampling pulse generating circuit 44 to the sample-and-hold circuit 22 thereby to obtain the tracking signal, whereas the crosstalk components of the pilot signals $P_{A2}$, $P_{A4}$ and $P_{A6}$ are sampled by the sampling pulse SP$_2$ which is supplied to the sample-and-hold circuit 60 to thereby produce the tracking signal. By the subtracter 23, the tracking signals corresponding to the crosstalk components of the pilot signals $P_{A7}$, $P_{A2}$; $P_{A9}$, $P_{A4}$; and $P_{A11}$, $P_{A6}$ are subtracted and the subtracted output is supplied to one input terminal of the multiplier 67. Further, the pilot signals $P_{B2}$, $P_{B4}$ and $P_{B6}$ from the track $5A_2$ being traced are peak-held (when the tracking phase lies in a range from substantially $-100°$ to $+100°$) by the peak-hold circuit 61 and then sampled and held by the sample-and-hold circuit 62, thereby delivered to the divider 66. After the reference signal is divided by the sampled and held output in the divider 66, the divided output is supplied to the multiplier 67. Then, the multiplied output from the multiplier 67 is sampled by the sampling pulse $SP_3$ which is supplied to the sample-and-hold circuit 24 whereby to obtain the tracking control signal for the head 1A.

In like manner, when the head 1B traces the track $5B_3$, as shown in FIG. 3, since the crosstalk components of the pilot signals $P_{B7}$, $P_{B9}$, $P_{B11}$, and $P_{B2}$, $P_{B4}$ and $P_{B6}$ of the adjacent tracks $5A_3$ and $5A_2$ are produced, the crosstalk components of the pilot signals $P_{B7}$, $P_{B9}$ and $P_{B11}$ are sampled by the sampling pulse $SP_1$ and the crosstalk components of the pilot signals $P_{B2}$, $P_{B4}$ and $P_{B6}$ are sampled by the sampling pulse $SP_2$. Then, the tracking signals corresponding to the crosstalk components of the pilot signals $P_{B7}$, $P_{B2}$; $P_{B9}$, $P_{B4}$; and $P_{B11}$, $P_{B6}$ are subtracted by the subtracter 23 and the subtracted output is multiplied with a signal which results from dividing the reference signal by the sampled and held outputs (when the tracking phase is in a range from substantially $-100°$ to $+100°$) corresponding to the pilot signals $P_{A7}$, $P_{A9}$ and $P_{A11}$. When the resultant multiplied output is finally sampled by the sampling pulse $SP_3$, it is possible to obtain the tracking control signal for the head 1B.

In the playback mode with tape speed twice that in the normal playback mode, the rotary head traces the track such that the center of the gap width of the rotary head passes the position shown by a broken line $T_D$ in FIG. 3. More specifically, upon recording, one of the adjacent two recording tracks 5A and 5B formed by the two rotary heads having different azimuth angles, for example, the track 5B is traced during the first half period of the tape contact periods of the respective rotary heads 1A and 1B, while the other track, for example, the track 5A is traced during the second half period thereof.

The signals derived from the magnetic tape 2 by the rotary heads 1A and 1B in the tracing manner as mentioned above are respectively supplied through the contact P of the switching circuit 15A, the amplifier 18A, and contact P of the switching circuit 15B, the amplifier 18B to the switching circuit 19. Similarly to the recording mode, this switching circuit 19 is alternately changed in position by the switching signal $S_1'$ having a frequency of 30 Hz generated from the timing signal generating circuit 10 shown in FIG. 6A during the half rotation or revolution period tA including the tape contact period of the head 1A and during the half revolution period tB including the tape contact period of the head 1B. Accordingly, from this switching circuit 19, there is produced an intermittent PCM signal $S_R$ of one segment each as shown in FIG. 6G. This segmented PCM signal $S_R$ is supplied to a playback processor (not shown) by which it is demodulated to the original PCM signal and then fed to a decoder in which a data of block unit is detected by a block synchronizing signal and an error correction, a de-interleaving and the like signal processings are carried out. Then, the signal is re-converted to the analog audio signal by a D/A-converter and then delivered to the output side.

The tracking control is carried out as follows.

For instance, when the head 1B traces the two tracks $5A_2$ and $5B_3$ in the tracing direction shown by the broken line $T_D$ in FIG. 3, the pilot signal $P_{A7}$ of the track $5B_3$, the pilot signal $P_{A2}$ of the track $5B_2$ and the pilot signal $P_{B2}$ of the track $5A_2$ are reproduced by the head 1B in the region $A_{T1}$ as shown in FIG. 3. In the region $A_{T3}$, the pilot signal $P_{A9}$ of the track $5B_3$, the pilot signal $P_{A4}$ of the track $5B_2$ and the pilot signal $P_{B4}$ of the track $5A_2$ are reproduced by the head 1B. In the region $A_{T2}$, the pilot signal $P_{B11}$ of the track $5A_3$, the pilot signal $P_{B6}$ of the track $5A_2$ and the pilot signal $P_{A11}$ of the track $5B_3$ are reproduced by the head 1B. At that time, the reproduced output of the head 1B and derived from the switching circuit 19 is supplied to the band-pass filter 20 of narrow band width having a center pass frequency $f_0$. This band-pass filter 20 produces only a pilot signal as its output $S_F$ as shown in the right-hand portion of FIG. 6H and this pilot signal is supplied to the peak-hold circuit 21.

Further, for example, when the head 1A traces the two tracks $5A_3$ and $5B_4$ in the tracing direction shown by the broken line $T_D$ in FIG. 3, in the region $A_{T1}$ shown in FIG. 3, the pilot signal $P_{A8}$ of the track $5B_4$, the pilot signal $P_{A7}$ of the track $5B_3$ and the pilot signal $P_{B7}$ of the track $5A_3$ are reproduced; in the region $A_{T3}$, the pilot signal $P_{A10}$ of the track $5B_4$ and the pilot signal $P_{A9}$ of the track $5B_3$ and the pilot signal $P_{B9}$ of the track $5_{A3}$ are reproduced; and in the region $A_{T2}$, the pilot signal $P_{B12}$ of the track $5A_4$, the pilot signal $P_{B11}$ of the track $5A_3$ and the pilot signal $P_{A12}$ of the track $5B_4$ are reproduced by the head 1A, respectively. At that time, the reproduced output of the head 1A, which is derived from the switching circuit 19, is supplied to the band-pass filter 20 which then produces only the pilot signal as its output $S_F$ as shown in the right-hand portion of FIG. 6H. This pilot signal is supplied to the peak-hold circuit 21, simultaneously.

Similarly as described above, the output $S_R$ from the switching circuit 19 is supplied to the band-pass filter 29 from which the erase signal $S_E$ (typically $E_{A7}$, $E_{A9}$ and $E_{A11}$ during the period tB, while typically $E_{B7}$, $E_{B9}$, and $E_{B11}$ during the period tA) shown in FIG. 6I is derived. This erase signal $S_E$ is supplied to the waveform shaping circuit 30 and thereby reshaped to be a signal $S_{22}$ shown in FIG. 6J. This signal $S_{22}$ is then fed to the leading edge detecting circuit 31, in which the leading edge thereof is detected and then delivered to the gate circuits $33_1$ to $33_6$.

Further, in the playback mode with tape speed twice that of the normal, on the basis of the setting command signal from the mode setting circuit 32, the window signal generating circuit 34 produces the window signals $S_{W2}$ and $S_{W5}$ shown in FIGS. 6C and 6F and then these window signals $S_{W2}$ and $S_{W5}$ are respectively fed to the gate circuits $33_2$ and $33_5$ as the gating signals thereof. Accordingly, the gate circuits $33_2$ and $33_5$ produce at their output sides substantially only the leading edges of the signal $S_{22}$ which enter the periods of the window signals $S_{W2}$ and $S_{W5}$. As a result, at the output side of the OR gate circuit 35 provided at the output sides of the gate circuits $33_2$ and $33_5$, there is produced a signal $S_{23}$ of narrow width which is coincident with the leading edge of the signal $S_{22}$ as shown in FIG. 6K.

This signal $S_{23}$ is supplied to the time delay circuit 36. Further, at that time, a delay time ta is selected in the delay time setting circuit 38 by the selector 37 for the time delay circuit 36. The time delay circuit 36 produces the signal $S_{24}$ that is delayed by time ta from the signal $S_{23}$ as shown by the left-hand portion of FIG. 6L during the period tB while produces the signal $S_{24}$ which is coincident with the signal $S_{23}$ as shown in the right-hand portion of FIG. 6L during the period tA.

This signal $S_{24}$ is supplied to the pulse generating circuit 43 which then generates the pulse Pi corresponding to each pilot signal to be detected as shown in FIG. 6M on the basis of the signal $S_{24}$. This pulse Pi is supplied to the sampling pulse generating circuit 44 and to the peak-hold circuit 21.

In this case, in the playback mode with the tape speed twice that of the normal playback mode, one tracking error signal is produced during both periods of the periods tB and tA, or during one revolution period of the rotary head.

During, for example, the period tB, when the pilot signal appearing last from the central region of the track which is being traced is peak-held by the first pulse $P_{i1}$ of the pulse Pi from the pulse generating circuit 43, or when the head 1B traces the both tracks $5A_2$ and $5B_3$, the crosstalk component of the pilot signal $P_{B4}$ of the track $5A_2$ is peak-held by the first pulse $P_{i1}$ in the peak-hold circuit 21 as shown in FIGS. 6H and 6M. Whereas, during the period tA, when the pilot signal appearing first from the central region of the track which is being traced is peak-held by the second pulse $P_{i2}$ of the pulse Pi from the pulse generating circuit 43, or when the head 1A traces both the tracks $5A_3$ and $5B_4$, as shown in FIGS. 6H and 6M, the crosstalk component of the pilot signal $P_{A10}$ of the track $5B_4$ is peak-held by the second pulse $P_{i2}$ in the peak-hold circuit 21.

Accordingly, in this playback mode, the pulse generating circuit 43 produces only the first pulse $P_{i1}$ of the pulse Pi during one tracing period of the head, for example, the period tB and only the second pulse $P_{i2}$ of the pulse Pi during the other tracing period of the head, for example, the period tA.

When the head 1B, for example, traces the both tracks $5A_2$ and $5B_3$ simultaneously as described above, the crosstalk component of the pilot signal $P_{B4}$ in the region $A_{T3}$ is peak-held by the first pulse $P_{i1}$ (FIG. 6M) of the pulse Pi from the pulse generating circuit 43 in the peak-hold circuit 21. The output from the peak-hold circuit 21 at that time is sampled in the sample-and-hold circuit 22 by the sampling pulse $SP_1$ (FIG. 6N) derived from the sampling pulse generating circuit 44 and then fed to another input terminal of the subtracter 23 so as to have a polarity same as that of the tracking signal upon normal playback mode.

When the head 1A traces the two tracks $5_{A3}$ and $5B_4$, the crosstalk component of the pilot signal $P_{A10}$ in the region $A_{T3}$ is peak-held in the peak-hold circuit 21 by the second pulse $P_{i2}$ (FIG. 6M) of the pulse Pi derived from the pulse generating circuit 43. The output from the peak-hold circuit 21 at that time is sampled in the sample-and-hold circuit 66 by the sampling pulse $SP_2$ (FIG. 6O) derived from the sampling pulse generating circuit 44 and then delivered to one input terminal of the subtracter 23.

Further, in any cases of the above-described tracings, the pilot signal $P_{A8}$ (when the tracking phase lies in a range from substantially $-100°$ to $+100°$) is peak-held by the peak-hold circuit 61 and then sampled and held by the sample-and-hold circuit 62.

Then, the multiplied output formed of the subtracted output from the subtracter 23 and the output resulting from dividing the reference signal by the output from the sample-and-hold circuit 62 is supplied to the sample-and-hold circuit 24, in which it is sampled by the sampling pulse $SP_3$ (though not shown, produced in response to a third pulse $P_{i3}$ (not shown) of the pulse Pi) derived from the sampling pulse generating circuit 44 and then fed via a contact a of the switching circuit 25 to the output terminal 26 as the tracking control signal.

The control signal thus developed at the output terminal 26 is supplied to the capstan motor by which the tape transport amount is controlled, so that when the head 1B traces both the tracks $5A_2$ and $5B_3$ or when the head 1A traces both the tracks $5A_3$ and $5B_4$, the rotary heads are controlled so as to draw the tracing loci as shown by the broken lines $T_D$ shown in FIG. 3.

In the playback mode with tape speed twice that of the normal playback mode, the crosstalk component of the pilot signal recorded on the central region of the track being traced is utilized. In this case, as shown in FIGS. 6P to 6R, it is possible to use the crosstalk component of the pilot signal recorded on the end portion of the track being traced.

For instance, during the period tB, the crosstalk component of the pilot signal $P_{A11}$ appearing last from the end region of the region being traced is peak-held in the peak-hold circuit 21 by the first pulse $Pi_1$ of the pulse Pi shown in FIG. 6P. Whereas, during the period tA, the crosstalk component of the pilot signal $P_{B7}$ appearing last from the beginning region of the track being traced is peak-held in the peak-hold circuit 21 by the second pulse $P_{i2}$ of the pulse Pi shown in FIG. 6P.

Then, during the period tB, the output from the peak-hold circuit 21 is sampled in the sample-and-hold circuit 22 by the sampling pulse $SP_1$, whose waveform is shown in FIG. 6Q, and which is produced from the sampling pulse generating circuit 44. The sampled output is then fed to one input terminal of the subtracter 23 similarly to the normal playback mode. Also the pilot signal $P_{A11}$ (when the tracking phase lies in a range from substantially $-100°$ to $+100°$) is peak-held by the peak-hold circuit 61 and then sampled and held by the sample-and-hold circuit 62. On the other hand, during the period tA, the output from the peak-hold circuit 21 is sampled in the sample-and-hold circuit 60 by the sampling pulse $SP_2$ derived from the sampling pulse generating circuit 44. The waveform of the sampling pulse $SP_2$ is shown in FIG. 6R. The sampled output is then delivered to another input terminal of the subtracter 23. Also the pilot signal $P_{B7}$ (when the tracking phase lies in a range from substantially $-100°$ to $+100°$) is peak-held by the peak-hold circuit 61 and then sampled and held by the sample-and-hold circuit 62. Then, the multiplied output formed of the subtracted output from the subtracter 23 and an output resulting from dividing the reference signal by the output from the sample-and-hold circuit 62 is sampled in the sample-and-hold circuit 24 by the sampling pulse $SP_3$ from the sampling pulse generating circuit 44. This sampled output is delivered to the output terminal 26 as the tracking control signal thereof.

In this case, on the basis of the setting command signal from the mode setting circuit 32, the window signal generating circuit 34 produces the window signals $S_{W3}$ and $S_{W4}$ as shown in FIGS. 6D and 6E. Then, only the leading edge of the signal $S_{22}$ which enters the periods of the window signals $S_{W3}$ and $S_{W4}$ is derived so that the OR gate circuit 35 produces at its output side the signal $S_{23}$ (FIG. 6K).

At that time, the selector 37 selects the setting circuit 39 and sets a delay time tb for the time delay circuit 36 which then produces at its output side the signal $S_{24}$ (FIG. 6L) which is delayed by time tb from the signal $S_{23}$. This signal $S_{24}$ is supplied to the pulse generating circuit 43 from which the pulse Pi shown in FIG. 6P is derived.

In the playback mode with tape speed three times that of the normal playback mode, even if the adjacent tracks 5A and 5B are different in azimuth angle, the rotary heads 1A and 1B alternately trace the tracks at a pitch of three tracks so that the heads do not trace the tracks different in azimuth angle unlike the case of the playback mode with tape speed twice that of the normal playback mode. Accordingly, in this embodiment, the rotary head is controlled so as to draw a tracing locus shown by a two-dot chain line $T_T$ in FIG. 3.

If now the head 1B traces a range of the tracing width W including the track $5B_3$ as shown by the two-dot chain line $T_T$ in FIG. 3, the head 1B traces the tracks $5A_3$ and $5A_2$ which are adjacent to the track $5B_3$. Thus, as shown in FIG. 3, in the region $A_{T1}$, the pilot signal $P_{A7}$ of the track $5B_3$, the pilot signal $P_{B7}$ of the adjacent track $5A_3$ and the pilot signal $P_{B2}$ of the track $5A_2$ are reproduced, and in the region $A_{T2}$, the pilot signal $P_{B11}$ of the adjacent track $5A_3$, the pilot signal $P_{B6}$ of the adjacent track $5A_2$ and the pilot signal $P_{A11}$ of the track $5B_3$ are reproduced, respectively. At that time, the reproduced output of the rotary head 1B passed through the switching circuit 19 is supplied to the band-pass filter 20 of narrow band width having the center pass frequency $f_0$ which then produces only the pilot signal as its output $S_F$ as shown in FIG. 7J. This pilot signal is supplied to the peak-hold circuit 21.

Further, the output $S_R$ from the switching circuit 19 is supplied to the band-pass filter 29 similarly as described hereinabove, which then produces the erase signal $S_E$ (typically represented as $E_{A7}$, $E_{A9}$ and $E_{A11}$) as shown in FIG. 7K. This erase signal $S_E$ is supplied to the waveform shaping circuit 30 and thereby reshaped as the signal $S_{22}$ shown in FIG. 7L, which then is fed to the leading edge detecting circuit 31, in which the leading edge thereof is detected and then delivered to the gate circuits $33_1$ to $33_6$.

In the playback mode with tape speed three times that of the normal playback mode, on the basis of the setting command signal from the mode setting circuit 32, the window signal generating circuit 34 produces window signals $S_{W2}$ and $S_{W5}$ as shown in FIGS. 7D and 7G, respectively. These window signals $S_{W2}$ and $S_{W5}$ are supplied to the gate circuits $33_2$ and $33_5$ as their gating signals. Accordingly, at their output terminals of these gate circuits $33_2$ and $33_5$, there is substantially derived only the leading edge of the signal $S_{22}$ which enters the periods of the window signals $S_{W2}$ and $S_{W5}$. As a result, at the output side of the OR gate circuit 35 provided at the output sides of the gate circuits $33_2$ and $33_5$, there is produced the signal $S_{23}$ of narrow width which is coincident with the leading edge of the signal $S_{22}$ as shown in FIG. 7M.

This signal $S_{23}$ is supplied to the time delay circuit 36. However, in this case, since the signal $S_{23}$ is coincident with the nearby portion of the center of the pilot signal that will be sampled similarly to the normal playback mode, it is not necessary to delay the signal $S_{23}$. Accordingly, at this time the delay time is not set for the time delay circuit 36 by the selector 37 but the time delay circuit 36 produces the signal $S_{24}$ which is coincident with the signal $S_{23}$ as shown in FIG. 7N.

This signal $S_{24}$ is supplied to the pulse generating circuit 43, in which on the basis of the signal $S_{24}$ a pair of pulses Pi corresponding to the respective pilot signals that will be detected are formed as shown in FIG. 7O. The pair of pulses Pi are respectively supplied to the sampling pulse generating circuit 44 and to the peak-hold circuit 21. Then, from the sampling pulse generating circuit 44, on the basis of the pair of pulses Pi, there are produced sampling pulses $SP_1$ and $SP_2$ shown in FIGS. 7P and 7Q, and the sampling pulse $SP_3$, whose waveform is not shown, following the sampling pulse $SP_2$, which then are delivered to the sample-and-hold circuits 22, 60 and 24, respectively.

Accordingly, during the period in which the track $5B_3$ is traced by the head 1B, as will be clear from FIG. 7, the crosstalk component of the pilot signal $P_{B9}$ of the adjacent track $5_{A3}$ opposite to the tape transport direction shown by the arrow 4T (FIG. 3) is peak-held by the first pulse $P_{i1}$ of the pulse Pi in the peak-hold circuit 21. The output from the peak-hold circuit 21 at that time is supplied to the sample-and-hold circuit 22, in which it is sampled by the sampling pulse $SP_1$ which is produced at the leading edge of the first pulse $P_{i1}$ and then fed to one input terminal of the subtracter 23 as the tracking signal of the advanced phase, similarly to the normal playback mode.

Further, the second pulse $P_{i2}$ of the pulse Pi is enabled to peak-hold the crosstalk component of the pilot signal $P_{B4}$ of the adjacent track $5A_2$ in the same tape transport direction in the peak-hold circuit 21. The output from the peak-hold circuit 21 at that time is supplied to the sample-and-hold circuit 60, in which it is sampled by the sampling pulse $SP_2$ which is produced at the trailing edge of the second pulse $P_{i2}$ and then fed to another input terminal of the subtracter 23 as a tracking signal of a delayed phase. Accordingly, the subtracter 23 subtracts the tracking signals corresponding to the crosstalk components of the pilot signals $P_{B9}$ and $P_{B4}$, respectively. Then, the multiplied output formed of the subtracted output and the output resulting from dividing the reference signal by the output (when the tracking phase lies in a range from substantially $-100°$ to $+100°$) of the sample-and-hold circuit 62 corresponding to the pilot signal $P_{A9}$ is supplied to the sample-and-hold circuit 24, in which it is sampled by the sampling pulse $SP_3$.

Consequently, this sample-and-hold circuit 24 produces the output of the multiplier 67 as the tracking control signal, which then is supplied via the contact a of the switching circuit 25 to a capstan motor (not shown) from the output terminal 26 to thereby control the tape transport amount with the result that by using the pilot signals $P_{B9}$ and $P_{B4}$ recorded on the central region $A_{T3}$, the head 1B is controlled so as to draw the tracing locus as shown by the two-dot chain line $T_T$ in FIG. 3.

The similar control is carried out for the other tracks. For example, when the head 1A traces the track $5A_4$ which is positioned with a delay of three tracks from the track $5B_3$ as shown by the two-dot chain line $T_T$ of FIG. 3, as shown by the right-hand portion of FIG. 7J, the crosstalk components of the pilot signals $P_{B8}$, $P_{B10}$ and $P_{B12}$ of the track $5A_4$; the pilot signals $P_{A13}$, $P_{A15}$ and $P_{A17}$; and $P_{A8}$, $P_{A10}$, and $P_{A12}$ of the adjacent tracks $5B_5$ and $5B_4$ are produced, so that of these crosstalk components, the crosstalk components of the pilot signals $P_{A15}$ and $P_{A10}$ recorded on the adjacent tracks $5B_5$ and $5B_4$ at their central portions (region $A_{T3}$) are sequentially peak-held by the peak-hold circuit 21. Then, by the sampling pulse $SP_1$ supplied from the sampling pulse generating circuit 44 to the sample-and-hold circuit 22, the crosstalk component of the pilot signal $P_{A15}$ is sampled to thereby produce the tracking signal. This tracking signal is supplied to the succeeding subtracter 23 and the output corresponding to the crosstalk component of the pilot signal $P_{A10}$ and derived from the peak-hold circuit 21 is supplied to the sample-and-hold circuit 60, in which it is sampled by the sampling pulse $SP_2$ to thereby produce the tracking signal which is then fed to the subtracter 23. Then, the tracking signals corresponding to the crosstalk components of the pilot signals $P_{A15}$ and $P_{A10}$ are subtracted, and the subtracted output and the multiplied output formed of the subtracted output and the output resulting from dividing the reference signal by the output (when the tracking phase is in a range from substantially $-100°$ to $+100°$) corresponding to the pilot signal $P_{B10}$ and derived from the sample-and-hold circuit 62 is sampled by the sampling pulse $SP_3$ which is supplied to the sample-and-hold circuit 24, thus the tracking control signal for the rotary head 1A being produced.

While in the above playback mode with tape speed three times that of the normal playback mode, the crosstalk component of the pilot signal recorded on the central region of the track being traced is utilized, it is possible to use the crosstalk component of the pilot signal recorded on the end portion of the track being traced as shown in FIGS. 7R to 7T.

For example, during the period tB, the crosstalk components of the pilot signals $P_{B2}$ and $P_{B11}$ which respectively appear first and latest in the beginning and end regions of the track being traced are respectively peak-held by the first pulse $P_{i1}$ and the second pulse $P_{i2}$ of the pulse Pi shown in FIG. 7R in the peak-hold circuit 21. Whereas, during the period tA, the crosstalk components of the pilot signals $P_{A8}$ and $P_{A17}$ which respectively appear second in the beginning and end regions of the track being traced are respectively peak-held by the first pulse $P_{i1}$ and the second pulse $P_{i2}$ of the pulse Pi shown in FIG. 7R in the peak-hold circuit 21.

Then, during the period tB, the output (corresponding to the pilot signal $P_{B2}$) from the peak-hold circuit 21 is sampled in the sample-and-hold circuit 22 by the sampling pulse $SP_1$ generated from the sampling pulse generating circuit 44. The waveform of the sampling pulse $SP_1$ is shown in FIG. 7S. In order to make its polarity same as that of the tracking error signal upon normal playback mode, this signal is supplied to the other input terminal of the subtracter 23. Further, the output of the peak-hold circuit 21, which is corresponding to the pilot signal $P_{B11}$, is supplied to the sample-and-hold circuit 60, in which it is sampled by the sampling pulse $SP_2$ generated from the sampling pulse generating circuit 44. The waveform of the sampling pulse $SP_2$ is shown in FIG. 7T. This sampled output is supplied to one input terminal of the subtracter 23. Then, the multiplied output formed of the subtracted output and the output resulting from dividing the reference signal by the output (when the tracking phase is in a range from $-100°$ to $+100°$) of the sample-and-hold circuit 62, which is corresponding to the pilot signals $P_{A7}$ and $P_{A11}$ is sampled in the sample-and-hold circuit 24 by the sampling pulse $SP_3$ derived from the sampling pulse generating circuit 44. The sampled signal output is delivered to the side of the output terminal 26 as the tracking control signal. Further, during the period tA, the similar operations are carried out for the pilot signals $P_{A8}$ and $P_{A17}$.

In this case, on the basis of the setting command signal from the mode setting circuit 32, the window signal generating circuit 34 produces the window signals $S_{W1}$, $S_{W3}$, $S_{W4}$ and $S_{W6}$ shown in FIGS. 7C, 7E, 7F and 7H, whereby only the leading edge of the signal $S_{22}$ which enters the periods of these window signals is derived to thereby produce the signal $S_{23}$ (FIG. 7M) at the output side of the OR gate circuit 35.

At that time, the selector 37 selects the setting circuit 38 which then sets the delay time ta for the time delay circuit 36. The time delay circuit 36 produces at its output side the signal $S_{24}$ (FIG. 7N) which is delayed by time ta from the signal $S_{23}$. This signal $S_{24}$ is supplied to the pulse generating circuit 43 which then produces the above pulse Pi shown in FIG. 7R.

In this embodiment, since the frequency $f_1$ of the erase signal E is previously selected to be a value having a relatively high azimuth loss and the erase signal E is recorded as mentioned above, the relation between the azimuth of the rotary head and the azimuth of the track being traced can not be neglected so that if the azimuth becomes different, or if the head is displaced from the track being traced and enters the adjacent track, the crosstalk component of the erase signal E can be reduced by that much.

Therefore, in this embodiment, if the displacement amount of the rotary head from the track is within a predetermined range, as described above, the tracking error output corresponding to the track displacement amount is detected to thereby carry out the normal tracking control operation, while if this track displacement amount exceeds the predetermined range, the control amount is fixed to a certain fixed potential Vcc by which the rotary head is forcibly tracking-controlled. At this time, with respect to the reference level for the comparison, of the reproduced output of the erase signal E (reversal azimuth) of the adjacent track when the rotary head traces the track having the same azimuth and of the reproduced output of the erase signal E (same azimuth) of the adjacent track when the rotary head traces the track having the same azimuth, the minimum value is determined so as to become larger than the reproduced output of higher level, whereas the maximum value is determined so as to become smaller than the reproduced output of the erase signal E of the track when the rotary head traces the track having the same azimuth. Then, the reference level is set at a desired point in a range from the minimum value to the maximum value.

Further, how to set this reference level will be described more fully. In general, in order to set this reference level without considering the influence of jitter and so on, as, for example, shown in FIG. 3, when the rotary head 1B traces the track 5B in a just tracking state, the maximum value is selected to be smaller than the reproduced output of the erase signal $E_{A2}$ of the same azimuth, the minimum value is selected to be larger than the reproduced output of the erase signal $E_{B2}$ or $E_{B1}$ of the reversal azimuth of the adjacent track $5A_2$ or $5A_1$ and also selected to be larger than the reproduced output of the erase signal $E_{A7}$ or $E_{A2}$ (both of them are the same in azimuth) of the adjacent track $5B_3$ or $5B_2$ when the head 1B traces the track $5A_2$ or $5A_1$ of the reversal azimuth with a displacement of one track in a just tracking state or selected to become larger than the reproduced output of the erase signal $E_{A2}$ or $E_{A1}$ (both of them are the same in azimuth) of the adjacent track $5B_2$ or $5B_1$. Then, the reference level is selected within a range from this maximum value to the minimum value.

However, when there are the influence by such as jitter and so on, if the recording time of the erase signal E is shorter than at least the recording time of the pilot signal P (corresponding to $\frac{1}{2}$tp in this embodiment) as described in this embodiment, the erase signals E of the both tracks adjacent the track being traced are overlapped partially so that the beginning end of the erase signal E can not be detected. As a result, a self clock can not be formed and hence there is a fear that the mis-operation will be caused in the tracking control operation.

If due to the influence of, for example, jitter, and so on the end portion of the erase signal $E_{A7}$, and the beginning end portion of the erase signal $E_{A2}$ are overlapped, when the rotary head 1B is displaced by one track amount to trace the track $5A_2$ of the reversal azimuth in a just tracking state, the added one of the reproduced outputs of the erase signals $E_{A7}$ and $E_{A2}$ of the same azimuth is detected. Accordingly, even if the minimum value of the reference level is selected to become larger than the reproduced output of the erase signal $E_{A7}$ or $E_{A2}$ which is one of the conditions to make the minimum value of the reference level as mentioned above, this minimum value causes the mis-operation. Therefore, in this case, the minimum value must be selected larger than the added value of the reproduced outputs of the above erase signals $E_{A7}$ and $E_{A2}$ so that a range in which the reference level is set in the comparing circuit 51 is made narrow.

Therefore, in this embodiment, as described above, the erase signal E is recorded such that the beginning end thereof is positioned near the center of the pilot signal P of the adjacent track and that the end thereof is terminated near the end portion of the corresponding pilot signal P. In other words, the recording time of the erase signal E becomes shorter than the recording time of at least the pilot signal P whereby to avoid the above-mentioned erase signals E from being overlapped with each other. Accordingly in this embodiment, it is not necessary to set the reference level which needs to consider the overlapped state of the erase signals E. Thus, the range of the minimum value can be widened so that even if there is the influence by the jitter and so on, the range for setting the reference level can be widened.

In this connection, in this embodiment, the minimum value of the reference level is determined such that the minimum value of the reference level is selected to become larger than the reproduced output of higher level of the reproduced output of the erase signal E (reversal azimuth) of the adjacent track when the rotary head traces the track which is same in azimuth and the reproduced output of the erase signal E (same azimuth) of the adjacent track when the rotary head traces the track of reversal azimuth with a displacement of one track, and the maximum value is determined similarly as described above.

In this case, it is necessary that the influence by the jitter within the time $\frac{1}{2}$tp can be mechanically absorbed well.

Accordingly, if the crosstalk output of the erase signal E that will be detected exceeds this reference level, the signal $S_{23}$ is produced as described above and on the basis of this signal $S_{23}$, the sampling pulses $SP_1$, $SP_2$ and $SP_3$ are generated. If on the other hand it is lower than the reference level, the rotary head already traces the track of reversal azimuth so that the signal $S_{23}$ is not produced and hence the sampling pulses $SP_1$, $SP_2$ and $SP_3$ are not produced, too. Therefore, in this embodiment, taking the reference level as the border line, if the crosstalk output of the erase signal E is lower than this reference level, it is regarded that the rotary head is largely displaced from the track and hence the rotary head is forced to be returned to the correct position.

This operation is carried out by the circuit arrangement following the comparing circuit 51 shown in FIG. 1. The operation of this circuit arrangement will be described with reference to FIG. 8.

When the signal $S_E$, shown in FIG. 8B, which is derived from the band-pass filter 29, is supplied to one input terminal of the comparing circuit 51, this signal $S_E$ is compared with a reference level derived from a reference voltage source 52 and supplied to the other input terminal of the comparing circuit 51. If this signal $S_E$ is larger than the reference level, the comparing circuit 51 produces at its output terminal the signal $S_{25}$ shown in FIG. 8C which then is fed to the flip-flop circuit 53 as its latch pulse. On the other hand, prior to the generation of this signal $S_{25}$, the trailing edge of the switching signal $S_1'$ (FIG. 8D) is detected by the trailing edge detecting circuit 54 and the detecting circuit 54 produces at its output terminal the signal $S_{26}$ shown in FIG. 8E. The flip-flop circuit 53 is reset by this signal $S_{26}$ as shown in FIG. 8H. Further, since a switching signal $\overline{S_1'}$, inverted by the inverter 55 and whose waveform is shown in FIG. 8F is supplied to the input terminal D of the flip-flop circuit 53, when the flip-flop circuit 53 is supplied with the signal $S_{26}$ (latch pulse), it produces at its output side the signal $S_{28}$ of high level (H) shown in FIG. 8H. This signal $S_{28}$ is then delivered to the succeeding flip-flop circuit 57.

The leading edge detecting circuit 56 detects the leading edge of the switching signal $S_1'$ and produces at its output terminal the signal $S_{27}$ shown in FIG. 8G which is then delivered to the clock terminal of the flip-flop circuit 57. At this time point, the signal $S_{29}$ of high level (H) shown in FIG. 8I is produced at the output side of the flip-flop circuit 57 and then fed to the switching circuit 25 as the switching control signal thereof. Since the switching circuit 25 is connected to the contact a when the signal $S_{29}$ is at high level, to the output terminal 26, there is delivered the tracking control signal from the sample-and-hold circuit 24.

If on the other hand the signal $S_E$ is lower than the reference level, the comparing circuit 51 does not produce at its output terminal the signal $S_{25}$, so that the flip-flop circuit 53 is still in the state reset by the signal $S_{26}$ and hence the output signal $S_{28}$ therefrom is kept at the low level (L) as shown by a broken line in FIG. 8H. Under this state, the output signal $S_{29}$ from the flip-flop circuit 57 is at low level (L) as shown by a broken line in FIG. 8I.

When the signal $S_{27}$ (FIG. 8G) is supplied to the flip-flop circuit 57 from the leading edge detecting circuit 56 at the leading edge of the switching signal $S_1'$, the output signal $S_{29}$ of the flip-flop circuit 57 is changed from the high level to the low level as shown by a broken line in FIG. 8I. Then, the signal $S_{29}$ of low level is supplied to the switching circuit 25 so that the switching circuit 25 is changed in position to the contact b. As a result, at the output terminal 26, there is generated a signal having a constant voltage potential Vcc from a terminal 58 and this signal is supplied to a capstan servo system (not shown) which then carries out the tracking control operation.

For example, when the constant potential Vcc is positive, the tape is transported at a higher speed via the capstan servo system so that the rotary head is substantially shifted to the next track corresponding to its own azimuth to thereby carry out the normal tracking operation. Whereas, when the constant potential Vcc is zero, the tape is transported at a low speed so that the rotary head is substantially returned to the track being traced, thus the rotary head begins the normal tracking operation.

As described above, in accordance with the present embodiment, even if the frequency signal having the azimuth loss is employed as the pilot signal, by peak-holding this pilot signal, independently from the difference from the difference of the tape and the rotary head, the inclination such as an S curve can be made constant and the rectilinear portion thereof can be enlarged.

In this embodiment, since the erase signal E for the pilot signal is selected to be a signal with a frequency which has relatively much azimuth loss and this signal is used as the position detecting signal for the pilot signal, the circuit arrangement without the so-called self clock can be simplified and the efficiency thereof can be improved.

Further, in this embodiment, since upon reproducing the beginning end of the reproduced output of the erase signal E recorded on the track is substantially taken as the reference to detect the pilot signal by which the sampling pulse is generated by itself, or the self clock as the sampling pulse is substantially generated from the track pattern, it is possible to remove a bad influence such as offset and so on unlike the case in which the pulse PG is taken as a reference.

Further, when the crosstalk component of the erase signal E having the frequency effective for the azimuth loss is lower than the reference value, the control amount is forcibly fixed to the constant potential and then the tracking control for the head is carried out, so that the tracking control with high precision becomes possible.

Further, since the sampling pulse is produced at every tracing period of the rotary head as mentioned above to thereby detect the tracking position, or the self clock as the sampling pulse is generated at every time each head is substantially on the track pattern to thereby detect each tracking position of each one track, it becomes possible to remove the influence caused by jitter.

Further, since in each playback mode the position of the pilot signal is detected by utilizing substantially the edge portion of the erase signal E therefor or by switching over the delay time from the edge portion, it is possible to make almost all of the circuit arrangement common.

Furthermore, since the recording is carried out such that the beginning end of the erase signal E which detects the position of the pilot signal is positioned near the center of the pilot signal of the adjacent track, it becomes unnecessary to provide the circuit or the like which delays the erase signal by which the beginning end of the erase signal E may be positioned near the center of the pilot signal, thus the circuit arrangement is being simplified by that much. Furthermore, since the recording time of the erase signal E is made shorter than at least the recording time of the pilot signal P, the erase signals E at the adjacent tracks are kept with a predetermined interval so that the recorded erase signal E can be prevented from being overlapped substantially between the adjacent tracks by the influence of jitter and so on, thus it is possible to give a tolerance to the range in which the reference level is set in the comparing circuit 51.

Figure 12B:
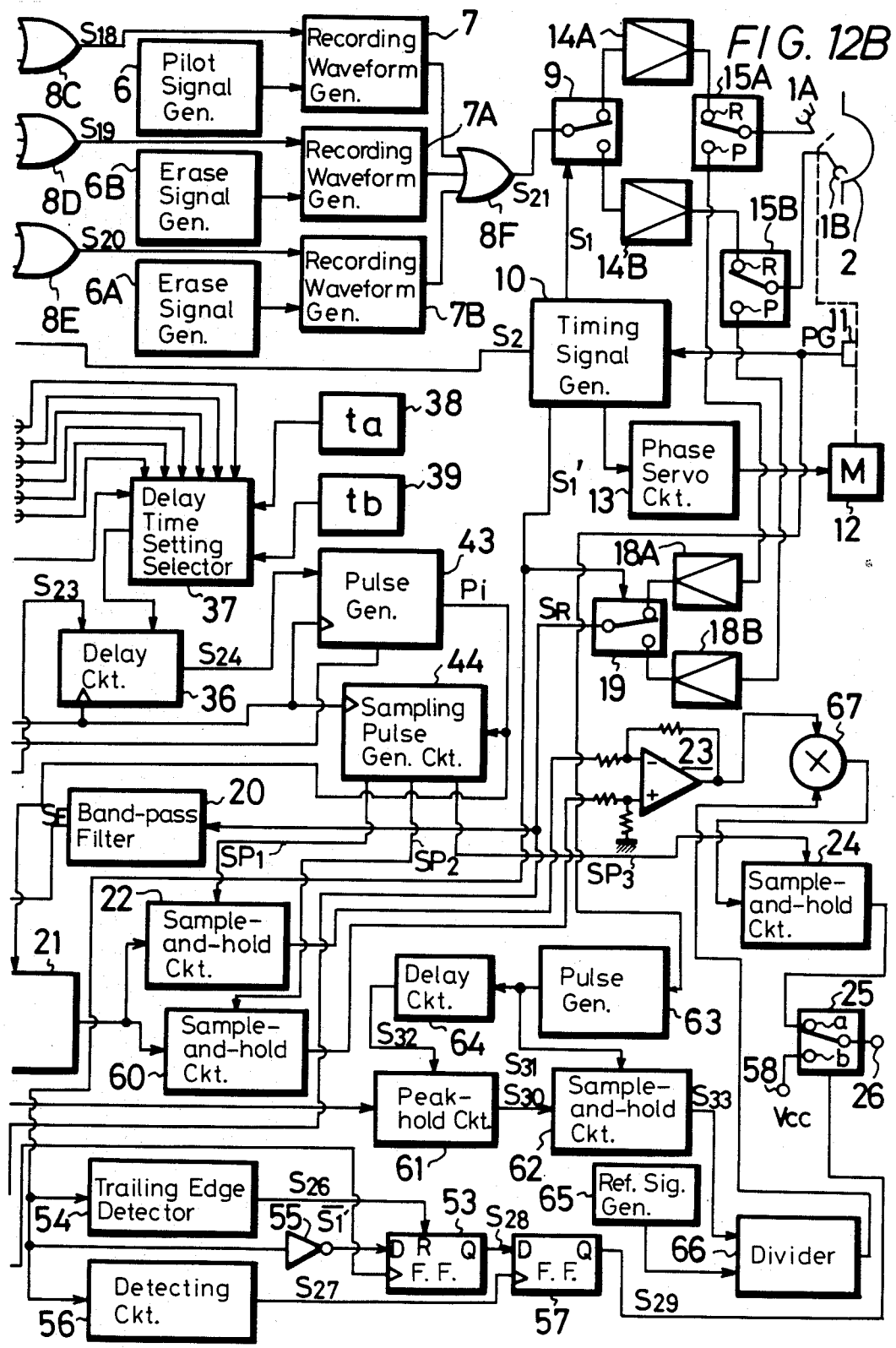
FIG. 12 (formed of FIGS. 12A and 12B) and FIG. 15 (formed of FIGS. 15A and 15B) are respectively block diagrams showing second and third embodiments of the present invention.

FIG. 12 is a block diagram showing a second embodiment of this invention. In FIG. 12, like parts corresponding to those of FIG. 1 are marked with the same references and will not be desribed in detail.

In order to apply the AGC, the above-described first embodiment utilizes the peak values of the crosstalk components of the pilot signal of the track being traced and of the pilot signals of the adjacent tracks, while the second embodiment utilizes the peak value of the position detecting signal which is used to detect the position of the pilot signal of the track being traced.

To this end, the input side of the peak-hold circuit 61 is connected to the output side of the band-pass filter 29, by which the signal $S_E$ (FIG. 13C) produced at the output side of the band-pass filter 29 is supplied to the peak-hold circuit 61.

Accordingly, the output $S_E$ of the band-pass filter 29, namely, the position detecting signal is supplied to the peak-hold circuit 61 by which the peak value thereof is held. As a result, at the output side of the peak-hold circuit 61, there is produced the signal $S_{30}$ shown in FIG. 13D. This signal $S_{30}$ is supplied to the sample-and-hold circuit 62, in which it is sampled by the signal $S_{31}$, shown in FIG. 13F, which is produced from the pulse generator 63 in synchronism with the pulse PG (FIG. 13E). As a result, the sample-and-hold circuit 62 produces at its output side the signal $S_{33}$ shown in FIG. 13H. In this case, the peak-hold state of the peak-hold circuit 61 is released by the signal $S_{32}$ (FIG. 13G) which is produced from the delay circuit 64 with a delay of a predetermined delay time t in response to the signal $S_{31}$ derived from the pulse generator 63.

The signal $S_{33}$ from the sample-and-hold circuit 62 is supplied to the divider 66 by which the reference signal from the reference signal generating circuit 65 is divided and then fed to the other input terminal of the multiplier 67. As a result, at the output terminal of the multiplier 67, there is produced an output the level of which is always made constant even if the level of the crosstalk component of the pilot signal is fluctuated by the scatterings of the magnetic tape, the rotary head and so on.

Figure 14:
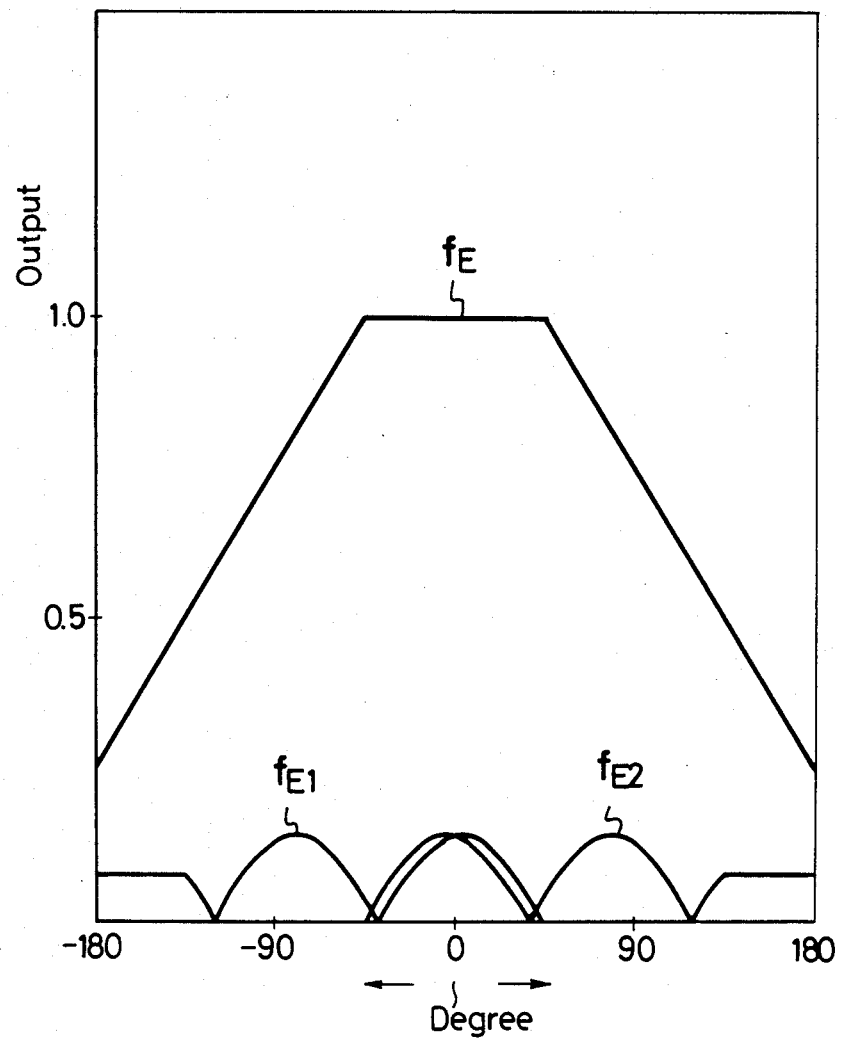

This will be described in detail with reference to FIGS. 14 and 11. FIG. 14 is a graph showing one example of the relation between the tracking phase and the crosstalk outputs of the position detecting signal from the track being traced and of the position detecting signal from the adjacent tracks. In FIG. 14, $f_E$ designates an output (corresponding to $E_{A2}$ of, for example, FIG. 13C) of the position detecting signal being traced and which is produced at the side of the sample-and-hold circuit 62, reference letter $f_{E1}$ designates the crosstalk component (corresponding to $E_{B1}$ of, for example, FIG. 13C) of the position detecting signal of the adjacent track and which is produced at the side of the sample-and-hold circuit 22, and reference letter $f_{E2}$ designates the crosstalk component (corresponding to $E_{B1}$ of, for example, FIG. 13C) of the position detecting signal of the adjacent track and which is produced at the side of the sample-and-hold circuit 60, respectively. When the tracking phase is 0°, the rotary head correctly traces the track without being displaced from the track and the output $f_E$ keeps a certain value with 0° as the center till ±45°. However, if the tracking phase is displaced from ±45°, the output $f_E$ is dropped rectilinearly with a certain inclination while the crosstalk components $f_{E1}$ and $f_{E2}$ are made constant at low level from −45° to +180° and +45° to −180°, respectively. Accordingly, during the period in which the track 5B, for example, is traced, in the peak-hold circuit 61, the position detecting signals $E_{A2}$, $E_{A4}$ and $E_{A6}$ of the track 5B₂ being traced are peak-held in a range in which the tracking phase lies in a range from −180° to +180°.

Then, in order to remove the bad influence caused by the scattering of the characteristic of the magnetic tape and the sensitivity of the rotary head and so on, in this embodiment, the output $f_E$ of the position detecting signal of the track being traced and which is produced at the output side of the sample-and-hold circuit 62 is supplied to the divider 66 in which the reference signal from the reference signal generating circuit 65 is divided by the output $f_E$ of the pilot signal supplied thereto. Then, the divided output is supplied to the multiplier 67, in which it is multiplied with the subtracted output from the subtracter 23.

If this is expressed with respect to the $f_E$, $f_{p1}$ and $f_{p2}$, this will be given by the following expression.

$$\frac{\text{Ref}}{f_E} \times (f_{p2} - f_{p1}) \quad (7)$$

In Expression (7), reference letter Ref designates the level (corresponding to the output 1.0 in, for example, FIG. 14) of the reference signal from the reference signal generating circuit 65, reference letter $f_E$ designates the output level of the sample-and-hold circuit 62 and ($f_{p2} - f_{p1}$) designates the output level of the subtracter 23, respectively. Further, in Expression (7), as will be clear from FIG. 14, $f_E$ is substantially equal to Ref in a range in which the tracking phase is in a range from −45° to +45°, so that Expression (7) is modified as $$\frac{\text{Ref}}{\text{Ref}} \times (f_{p2} - f_{p1}) = (f_{p2} - f_{p1}) \quad (8)$$

That is, in a range where the tracking phase is in a range from −45° to +45°, the output from the multiplier 67 is changed rectilinearly with respect to ($f_{p2} - f_{p1}$).

Further, in a range where the tracking phase is from +45° to +180°, as will be clear from FIG. 10, $f_{p1} = 0$ is established so that Expression (7) is modified as $$\frac{\text{Ref}}{f_E} \times f_{p2} \quad (9)$$

From Expression (9), it will be seen that as $f_E$ becomes small, the calculated value of Expression (9) becomes large. In other words, in a range where the tracking phase is from +45° to +180°, the correction by the AGC is carried out, so that the output from the multiplier 67 is changed rectilinearly.

Further, in a range where the tracking phase is in a range from −45° to −180°, as will be clear from FIG. 10, $f_{p2} = 0$ is established so that Expression (7) is modified as $$\frac{\text{Ref}}{f_E} \times (-f_{p1}) \quad (10)$$

From Expression (10), it will be seen that as the $f_E$ becomes small, the calculated value of Expression (10) becomes large. That is, in a range where the tracking phase lies in a range from −45° to −180°, the correction by the AGC is carried out so that the output from the multiplier 67 is changed rectilinearly, too.

If these operations as described hereinabove are illustrated in the graph, these will be expressed by a solid line c in the graph of FIG. 11. Also in this case, the broken line c is indicated in a range from 0° to +180° and a substantially similar characteristic can be given over a range from 0° to −180°.

As set forth above, according to this embodiment, as will be clear from the comparison of the broken line b and the solid line c in FIG. 11, it becomes possible to enlarge the linearity of the S curve more than the first embodiment as mentioned above so that the more stable tracking servo becomes possible. In this connection, although the linearity of the second embodiment is not indicated in FIG. 11, it is maintained in a range of the tracking phase from −180° to +180° and this linearity becomes substantially ideal characteristic shown by a broken line d in FIG. 11.

Figure 15A:
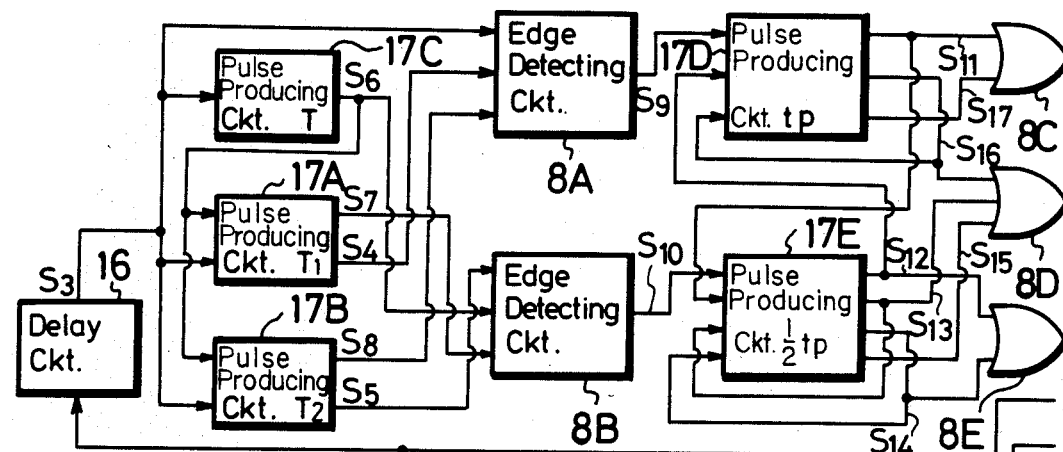
Figure 15:
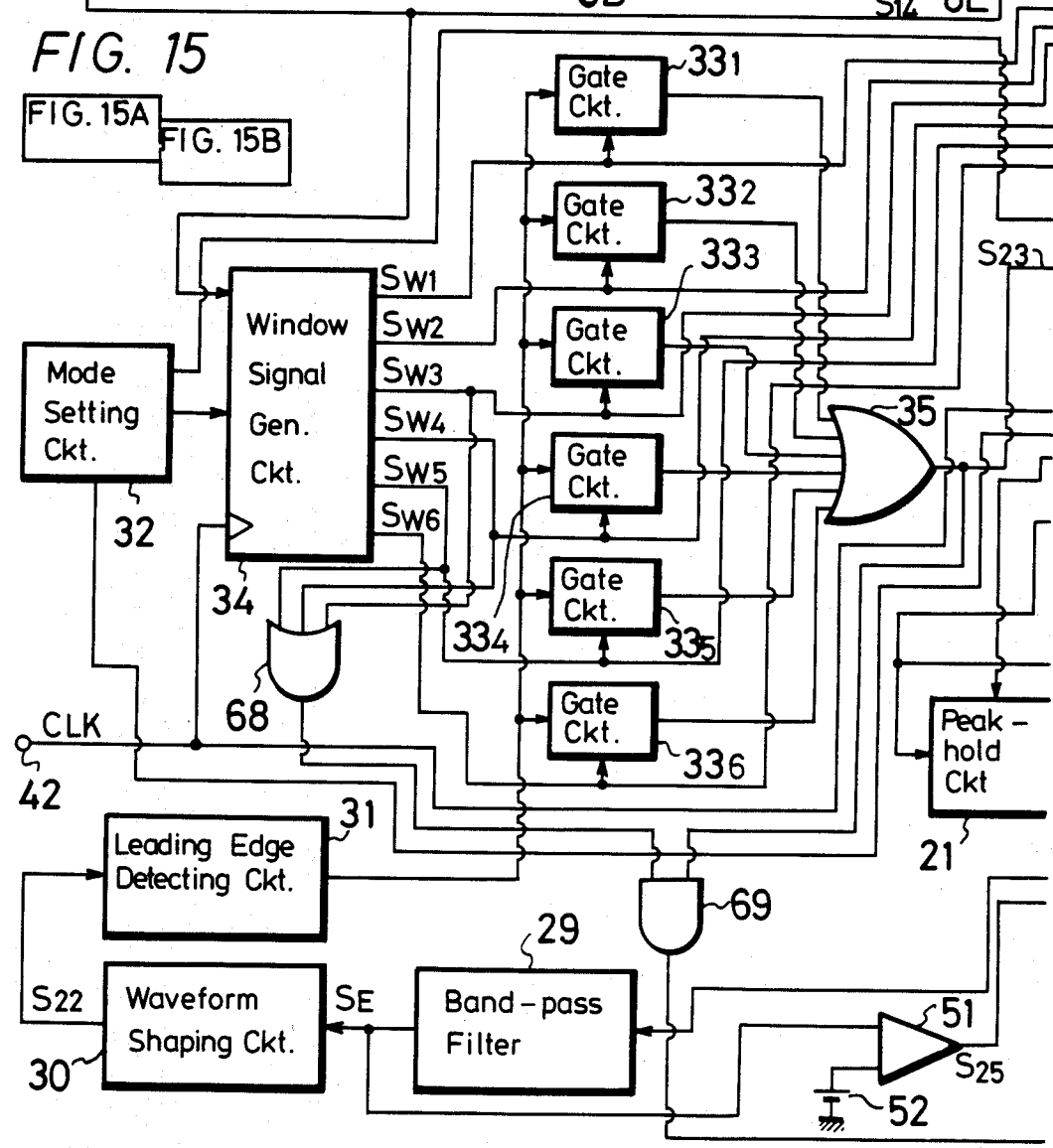

FIG. 15 is a block diagram showing a third embodiment of the present invention. In FIG. 15, like parts corresponding to those of FIG. 1 are marked with the same references and will not be described in detail.

When the AGC is made effective, while the first embodiment of the invention utilizes the peak values of the pilot signal of the track being traced and of the pilot signal of the adjacent tracks, this embodiment utilizes only the peak value of the pilot signal of the track being traced.

To this end, some technique must be used so that the crosstalk component (having the reversal azimuth relative to the pilot signal of the track being traced) of the pilot signal of the adjacent tracks is removed and that only the pilot signal of the track being traced is extracted. Therefore, it is considered to use the pattern in which the position detecting signal is detected first and the pilot signal of the same azimuth always comes later, or in FIG. 3, the pattern recorded in the region $A_{T2}$ of the track 5B and the patterns recorded on the regions $A_{T1}$ and $A_{T3}$ of the track 5A. In the case where the tracks 5B₂ and 5A₂ are traced by the rotary head as shown in FIGS. 16A to 16L, the relation between the position detecting signal $E_{A6}$ and the pilot signal $P_{A6}$ in the period tB (the left-hand portion of FIG. 16) and the relation between the position detecting signals $E_{B2}$, $E_{B4}$ and the pilot signals $P_{B2}$ and $P_{B4}$ in the period tA (the right-hand portion can satisfy this condition).

To this end, the window signals $S_{W3}$ to $S_{W5}$ (FIGS. 16D to 16F) are supplied through an OR gate circuit 68 to an AND circuit 69. During a period in which this AND circuit 69 opens its gate, the signal $S_{23}$ (FIG. 16G) from the OR gate circuit 35 which is coincident with the leading edge of the position detecting signal is passed therethrough and the AND circuit 69 produces at its output side a signal $S_{34}$ shown in FIG. 16H. This signal $S_{34}$ is supplied to the pulse generating circuit 63 and the delay circuit 64 so that the delay circuit 64 produces at its output side the signal $S_{31}$ (FIG. 16I) which is delayed from the signal $S_{34}$ by a predetermined delay time $t_3$. This signal $S_{31}$ is supplied to the sample-and-hold circuit 62 as its sampling pulse.

The peak-hold circuit 61 holds in turn the pilot signals $P_{A6}$, $P_{B2}$ and $P_{B4}$ derived from the tracks being traced and which is derived from the band-pass filter 20. Then, the peak-hold circuit 61 produces at its output side the signal $S_{30}$ shown in FIG. 16J. Further, from the pulse generating circuit 63, there is supplied to the peak-hold circuit 61 the signal $S_{32}$ which is fallen down with the delay from the signal $S_{34}$ by a predetermined time $t_4$ and which rises up with the delay of a predetermined time $t_5$ thereafter. The peak-hold state of the peak-hold circuit 61 is released by this signal $S_{32}$.

The signal $S_{30}$ from the peak-hold circuit 61 is supplied to the sample-and-hold circuit 62, in which it is sampled by the signal $S_{31}$ as mentioned above and the sample-and-hold circuit 62 produces at its output side a signal $S_{33}$ shown in FIG. 16L.

The signal $S_{33}$ from the sample-and-hold circuit 62 is supplied to the divider 66 as mentioned above by which the reference signal from the reference signal generating circuit 65 is divided and then the divided output is fed to the other input terminal of the multiplier 67. As a result, at the output side of the multiplier 67, there is produced an output the level of which is made constant even if the characteristic of the tape and the sensitivity of the rotary head and so on are scattered.

In this case, it is sufficient to consider only the pilot signal from the track which is traced with respect to the relation between the tracking phase and the pilot signal. Therefore, in FIG. 10, it is sufficient to consider only the output $f_p$ from which the crosstalk components $f_{p1}$ and $f_{p2}$ are removed. In other words, the correction is carried out similarly to the output $f_E$ of FIG. 14 which is related to the position detecting signal. In connection with Eqs. (7) to (10), this can be regarded as equivalent to the case that the output $f_E$ of the position detecting signal in each equation is replaced by the output $f_p$ of the pilot signal. Accordingly, in this case the characteristic of the S curve becomes equivalent to the solid line c shown in FIG. 11, or it becomes equivalent to the characteristic when the peak value of the position detecting signal is utilized.

As described above, according to this embodiment, since the linearity is maintained in a range from $-180°$ to $+180°$ and becomes substantially the ideal characteristic shown by the broken line d in FIG. 11, the more stable tracking servo becomes possible.

In the above-mentioned embodiments, the present invention can also be applied to a case in which a plurality of position detecting signals having different frequencies are recorded. In that case, it is sufficient that the frequency characteristic of the band-pass filter 29 is changed to become the same level in accordance with the reproduction levels of the position detecting signals having the different frequencies.

As set forth above, according to this invention, since the maximum value (peak value) of the level of the tracking control signal such as the pilot signal and the position detecting signal and so on is detected, this detected signal is compared with the reference signal and the amplification factor of the transmission system is adjusted by the compared output, the inclination of the S curve can be made constant regardless of the characteristic of the magnetic tape and the sensitivity of the rotary head and thus it becomes possible to stabilize the tracking servo system. Further, even if the pilot signal has a small azimuth loss, the portion in which the linearity can be maintained is enlarged, whereby under the off-track state, the servo system can be stabilized. Furthermore, since the linear portion is enlarged and the inclination is made constant, it becomes possible to freely off-track the tracking by the reference voltage, the present invention is very suited in the use of a case in which the user wants to displace the tracking state intentionally.

Furthermore, when the recorded track is traced by the rotary head, the beginning end of the erase signal E having a frequency which has relatively high azimuth loss and which is recorded so as to have a recording time shorter than the recording time of the pilot signal is taken as a reference for forming a pulse signal which detects this pilot signal, the tracking control of the rotary head is carried out by the tracking control signal based on the detected output and when the reproduced output of the erase signal E is lower than the reference value, the control amount is fixed to a certain constant potential to thereby carry out the tracking control of the rotary head. Accordingly, even if the apparatus has a mechanical, long-enduring variation, a temperature change or jitter, the apparatus is made free of such influences. Thus, upon playback mode, even if the apparatus is different than the apparatus used in the recording mode, it is possible to carry out the tracking control with high accuracy upon normal playback mode or upon playback mode with variable tape speed, and thus the compatibility between the apparatus can be improved.

The above description is given on the preferred embodiments of the invention but it will be apparent that many modifications and variations could be effected by one skilled in the art without departing from the spirit or scope of the novel concepts of the invention, so that the scope of the invention should be determined by the appended claims only.

We claim as our invention:

1. A method for reproducing signals recorded in a plurality of slant tracks on a recording medium by a rotary head, the signals in the tracks containing a digital information signal in a first predetermined area on said slant tracks and a tracking control signal including a tracking pilot signal and a signal used for erasing a previously recorded signal in a second predetermined area, comprising the steps of:

reproducing the tracking pilot signals recorded at respective second predetermined areas from both tracks adjacent a track being traced by a rotary head to provide levels of said tracking pilot signals;

comparing said levels of said tracking pilot signals reproduced from said adjacent tracks;

generating a head tracking signal in response to said level comparison;

controlling a tracking alignment of the rotary head relative to said slant tracks in response to said head tracking signal;

detecting the level of said tracking control signal recorded in said second area of said track being traced; and adjusting the level of said head tracking signal in response to said detected level of said tracking control signal so as to accurately track said track being traced.

2. A method for reproducing signals recorded in a plurality of slant tracks on a recording medium by a rotary head, the signals in the tracks containing a digital information signal in a first predetermined area on said slant tracks and a tracking control signal including a tracking pilot signal and a signal used for erasing a previously recorded signal in a second predetermined area, comprising the steps of:

reproducing the tracking pilot signals recorded at respective second predetermined areas from both tracks adjacent a track being traced by a rotary head to provide levels of said tracking pilot signals;

comparing said levels of said tracking pilot signals reproduced from said adjacent tracks;

generating a head tracking signal in response to said level comparison;

controlling a tracking alignment of the rotary head relative to said slant track is in response to said head tracking signal;

detecting the level of said tracking control signal recorded in said second area of said track being traced; and adjusting the level of said head tracking signal in response to said detected level of said tracking control signal;

in which said step of detecting the level of said tracking control signal includes the step of holding the peak level of said tracking pilot signal, and dividing the signal being held by a reference level, and said step of adjusting the level of the tracking signal includes the step of multiplying the divided signal and a signal produced by said step of level comparing.

3. A method for reproducing signals recorded in a plurality of slant tracks on a recording medium by a rotary head, the signals in the tracks containing a digital information signal in a first predetermined area on said slant tracks and a tracking control signal including a tracking pilot signal and a signal used for erasing a previously recorded signal in a second predetermined area, comprising the steps of:

reproducing the tracking pilot signals recorded at respective second predetermined areas from both tracks adjacent a track being traced by a rotary head to provide levels of said tracking pilot signals;

comparing said levels of said tracking pilot signals reproduced from said adjacent tracks;

generating a head tracking signal in response to said level comparison;

controlling a tracking alignment of the rotary head relative to said slant tracks in response to said head tracking signal;

detecting the level of said tracking control signal recorded in said second area of said track being traced; and adjusting the level of said head tracking signal in response to said detected level of said tracking control signal;

in which said step of detecting the level of said tracking control signal includes the step of holding the peak level of said said signal used for erasing a previously recorded signal and dividing the signal being held by a reference level, and said step of adjusting the level of the tracking signal includes the step of multiplying the divided signal and a signal produced by the step of level comparing.

4. An apparatus for reproducing signals recorded in a plurality of slant tracks on a recording medium by a rotary head, the signals in the tracks containing a digital information signal in a first predetermined area on each of said slant tracks and a tracking control signal including a tracking pilot signal and a signal used for erasing a previously recorded signal in a second predetermined area on each of said tracks, comprising:

means for reproducing the tracking pilot signals recorded at respective second predetermined areas from both tracks adjacent a track being traced by a rotary head to provide levels of said tracking pilot signals;

means for comparing said levels of said tracking pilot signals reproduced from said adjacent tracks and producing a corresponding output;

means for generating a head tracking signal in response to said output from said comparing means;

means for controlling a tracking alignment of the rotary head relative to said slant tracks in response to said head tracking signal;

means for detecting the level of said tracking control signal recorded in said second predetermined area of said track being traced and producing a level detected output indicative of said detected level of the tracking control signal; and means for adjusting the level of said head tracking signal in response to said level detected output from said detecting means so as to accurately track said track being traced.

5. An apparatus for reproducing signals recorded in a plurality of slant tracks on a recording medium by a rotary head, the signals in the tracks containing a digital information signal in a first predetermined area on each of said slant tracks and a tracking control signal including a tracking pilot signal and a signal used for erasing a previously recorded signal in a second predetermined area on each of said slant tracks, comprising:

means for reproducing the tracking pilot signals recorded at respective second predetermined areas from both tracks adjacent a track being traced by a rotary head to provide levels of said tracking pilot signals;

means for comparing said levels of said tracking pilot signals reproduced from said adjacent tracks and producing a corresponding output;

means for generating a head tracking signal in response to said output from said comparing means;

means for controlling a tracking alignment of the rotary head relative to said slant tracks in response to said head tracking signal;

means for detecting the level of said tracking control signal recorded in said second predetermined area of said track being traced and producing a level detected output indicative of said detected level of the tracking control signal; and means for adjusting the level of said head tracking signal in response to said level detected output from said detecting means;

in which said means for detecting the level of said tracking control signal includes means for holding the peak level of said pilot signal and means for dividing the signal being held by a reference level, and said means for adjusting the level of the tracking signal includes means for multiplying a signal from said means for dividing and a signal from said means for comparing.

6. An apparatus for reproducing signals recorded in a plurality of slant tracks on a recording medium by a rotary head, the signals in the tracks containing a digital information signal in a first predetermined area on each of said slant tracks and a tracking control signal including a tracking pilot signal and a signal used for erasing a previously recorded signal in a second predetermined area on each of said slant tracks, comprising:

- means for reproducing the tracking pilot signals recorded at respective second predetermined areas from both tracks adjacent a track being traced by a rotary head to provide levels of said tracking pilot signals;
- means for comparing said levels of said tracking pilot signals reproduced from said adjacent tracks and producing a corresponding output;
- means for generating a head tracking signal in response to said output from said comparing means;
- means for controlling a tracking alignment of the rotary head relative to said slant tracks in response to said head tracking signal;
- means for detecting the level of said tracking control signal recorded in said second predetermined area of said track being traced and producing a level detected output indicative of said detected level of the tracking control signal; and
- means for adjusting the level of said head tracking signal in response to said level detected output from said detecting means so as to accurately track said track being traced;
- in which said means for detecting the level of said tracking control signal includes means for holding the peak level of said signal used for erasing a previously recorded signal and means for dividing the signal being held by a reference level and said means for adjusting the level of the tracking signal includes means for multiplying an output signal from said means for dividing and an output signal from said means for comparing.

* * * * *